US012466195B2

(12) United States Patent
Hirafuji

(10) Patent No.: US 12,466,195 B2
(45) Date of Patent: Nov. 11, 2025

(54) PRINTER, PRINTING METHOD FOR PRINTER, AND PROGRAM

(71) Applicant: SATO HOLDINGS KABUSHIKI KAISHA, Tokyo (JP)

(72) Inventor: Takuma Hirafuji, Tokyo (JP)

(73) Assignee: SATO CORPORATION, Tokyo (JP)

( * ) Notice: Subject to any disclaimer, the term of this patent is extended or adjusted under 35 U.S.C. 154(b) by 49 days.

(21) Appl. No.: 18/267,393

(22) PCT Filed: May 26, 2022

(86) PCT No.: PCT/JP2022/021559

§ 371 (c)(1),
(2) Date: Jun. 14, 2023

(87) PCT Pub. No.: WO2022/259878

PCT Pub. Date: Dec. 15, 2022

(65) Prior Publication Data

US 2024/0051307 A1 Feb. 15, 2024

(30) Foreign Application Priority Data

Jun. 7, 2021 (JP) ................................ 2021-095021

(51) Int. Cl.
*B41J 2/37* (2006.01)
*B41J 2/045* (2006.01)

(52) U.S. Cl.
CPC ............ *B41J 2/37* (2013.01); *B41J 2/04541* (2013.01)

(58) Field of Classification Search
CPC . B41J 2/35; B41J 2/3551; B41J 2/3553; B41J 2/3555; B41J 2/3556; B41J 2/3558; B41J 2/365; B41J 2/355; B41J 2/32; B41J 2/04541; B41J 2/37; B41J 2/36
See application file for complete search history.

(56) References Cited

U.S. PATENT DOCUMENTS

2006/0176358 A1 8/2006 Mulhearn et al.
2013/0033555 A1 2/2013 Matsutani

FOREIGN PATENT DOCUMENTS

JP H08-281993 A 10/1996
JP 2009-113445 A 5/2009
JP 2010-228259 A1 10/2010
JP 2012-076352 A 4/2012
JP 2014-168903 A 9/2014
JP 2018-047642 A 3/2018

*Primary Examiner* — Kristal Feggins
(74) *Attorney, Agent, or Firm* — Foley & Lardner LLP

(57) ABSTRACT

A printer is configured to print on a print medium having a thermal color developing layer and includes: a thermal head having a plurality of heating elements that are arranged in a line; and a processor configured to: set a first application period of a pulse of energizing current, during a scanning line time for one line, the pulse of energizing current applying thermal energy that causes the thermal color developing layer to develop color, to the plurality of heating elements, correct a length of the first application period, which is set by the processor, based on an image to be printed, and determine print speed to be applied in printing the whole image at a constant speed, by extending the scanning line time so as to contain a maximum length of the first application period that has been corrected by the processor.

10 Claims, 17 Drawing Sheets

| PRINT SPEED [IPS] | SCANNING LINE TIME [μs] | DENSITY | STROBE LENGTH [μs] | | | |
|---|---|---|---|---|---|---|
| | | | L1 | L2 | L3 | L4 |
| 2 | 2500 | 1A | ↑ SHORTER | ··· | ··· | ··· |
| | | ⋮ | | ··· | ··· | ··· |
| | | 5A | 700 | ··· | ··· | ··· |
| | | ⋮ | | ··· | ··· | ··· |
| | | 10A | ↓ LONGER | ··· | ··· | ··· |
| 3 | 1644 | 1A | ↑ SHORTER | ··· | ··· | ··· |
| | | ⋮ | | ··· | ··· | ··· |
| | | 5A | 500 | ··· | ··· | ··· |
| | | ⋮ | | ··· | ··· | ··· |
| | | 10A | ↓ LONGER | ··· | ··· | ··· |
| 6 | 822 | 1A | ↑ SHORTER | ··· | ··· | ··· |
| | | ⋮ | | ··· | ··· | ··· |
| | | 5A | 300 | ··· | ··· | ··· |
| | | ⋮ | | ··· | ··· | ··· |
| | | 10A | ↓ LONGER | ··· | ··· | ··· |

REFERENCE STROBE TABLE

FIG.6

| BATTERY VOLTAGE | VOLTAGE-BASED CORRECTION RATIO |
|---|---|
| $V_{MAX}$ | 100%(Ref.) |
| ⋮ | ↓ |
| | GREATER |
| ⋮ | ↓ |
| $V_{MIN}$ | ↓ |

BATTERY VOLTAGE-BASED CORRECTION

| NUMBER OF SIMULTANEOUSLY PRINTING DOTS | NUMBER-OF-DOTS-BASED CORRECTION RATIO |
|---|---|
| 1 | 100%(Ref.) |
| 2 | ↓ |
| ⋮<br>⋮ | GREATER |
| N | ↓ |

NUMBER-OF-DOTS-BASED CORRECTION TABLE

FIG.9

| THERMAL HEAD TEMPERATURE | TEMPERATURE-BASED CORRECTION RATIO |
|---|---|
| 100°C | ↑ |
| ⋮ | SMALLER |
| 25°C | 100%(Ref.) |
| ⋮ | GREATER |
| -25°C | ↓ |

TEMPERATURE-BASED CORRECTION TABLE

FIG.10

PRINTER, PRINTING METHOD FOR PRINTER, AND PROGRAM

FIELD

The present invention relates to a printer, a printing method for a printer, and a program.

BACKGROUND

In general, a thermal head supplies a predetermined current independently to a plurality of heating elements, which are arranged in a line shape, to heat them and form a dot pattern on a print medium having a thermal color developing layer, whereby it prints information. In this process, color development of a dot corresponding to a heating element is controlled by time during which current is supplied to the heating element (that is, a pulse width of energizing current).

Printing may be performed on a print medium with the use of a thermal head by a known method of variably controlling print speed per print target line. In one example, Japanese Unexamined Patent Application Publication No. 2010-228259 discloses a label printer including a measuring unit, a storage unit, and a feeding unit. The measuring unit measures a ratio of a printing area of each line in a direction perpendicular to a direction of feeding a recording medium, from print data. The storage unit stores a feeding speed table in which optical density, a ratio of a printing area, and a feeding speed are associated with each other. The feeding unit feeds a recording medium by referring to the feeding speed table to determine a feeding speed based on the value of the ratio of the printing area, which is measured by the measuring unit.

BRIEF SUMMARY

Technical Problem

As in existing printing control methods, the print speed may be varied per line in one page, among a plurality of print speeds that are determined in advance (e.g., speeds set in the feeding speed table in Japanese Unexamined Patent Application Publication No. 2010-228259). Unfortunately, this method is not designed to make optical density uniform in one page and tends to reduce print quality. Specifically, in this method of varying print speed, optical density when the print speed is constant and optical density while the print speed is being varied are not the same, whereby print quality of one whole page may be reduced.

In view of these circumstances, an object of the present invention is to improve print quality to be higher than before, in printing a print medium by using a thermal head.

Solution to Problem

An embodiment of the present invention provides a printer configured to print on a print medium having a thermal color developing layer.

The printer includes a thermal head, a pulse setting unit, an application period correction unit, and a print speed determination unit.

The thermal head has a plurality of heating elements that are arranged in a line.

The pulse setting unit is configured to set a first application period of a pulse of energizing current, during a scanning line time for one line. The pulse of energizing current is configured to apply thermal energy that causes the thermal color developing layer to develop color, to the plurality of heating elements.

The application period correction unit is configured to correct a length of the first application period, which is set by the pulse setting unit, based on an image to be printed.

The print speed determination unit is configured to determine print speed to be applied in printing the whole image at a constant speed, by extending the scanning line time so as to contain a maximum length of the first application period that has been corrected by the application period correction unit.

Advantageous Effects

An embodiment of the present invention enables improving print quality to be higher than before, in printing a print medium by using a thermal head.

BRIEF DESCRIPTION OF DRAWINGS

FIG. 6 shows an example of data components of a reference strobe table.

FIG. 9 shows examples of a battery voltage-based correction table and a number-of-dots-based correction table.

FIG. 10 shows an example of a temperature-based correction table.

DETAILED DESCRIPTION

The following describes a printer according to an embodiment. A printer of an embodiment is a thermal printer that prints a print medium having a thermal color developing layer. The print medium can include any material as a substrate, and the substrate is not limited to papers. For example, a film can also be used as the substrate.

A printer of an embodiment includes a pulse setting unit and a thermal head that has a plurality of heating elements arranged in a line. The pulse setting unit sets an application period (first application period) of a pulse of energizing current, during a scanning line time for one line. The pulse of energizing current applies thermal energy that causes the thermal color developing layer to develop color, to the plurality of heating elements of the thermal head. A strobe signal that will be described later is an example of a pulse of energizing current.

A printer of an embodiment determines print speed to be used in printing the whole print target image at a constant speed, by correcting the length of the first application period set by the pulse setting unit, and by extending a scanning line time so as to contain the maximum length of the corrected first application period, based on the print target image. Thus, print speed is not varied in the whole period of printing the image, whereby uneven optical density is avoided, and print quality of one whole page is improved.

In a printer of an embodiment, prior to printing a print medium, print speed for printing is corrected so as to be reduced from a preliminarily set print speed. Moreover, one or both of the corrected print speed and the length of the first application period are corrected so that a difference in ratios of the first application period of a pulse of energizing current in a scanning line time before and after correction of print speed will be a predetermined value or less. As described later, findings obtained by the inventor has revealed that optical density depends on a ratio of the first application period of a pulse of energizing current in a scanning line time, and therefore, variations in optical density can be reduced by preventing a difference in ratios before and after the correction from being greatly changed.

Further details of the printer of the embodiment will be described with reference to the attached drawings, hereinafter.

Figure 1:
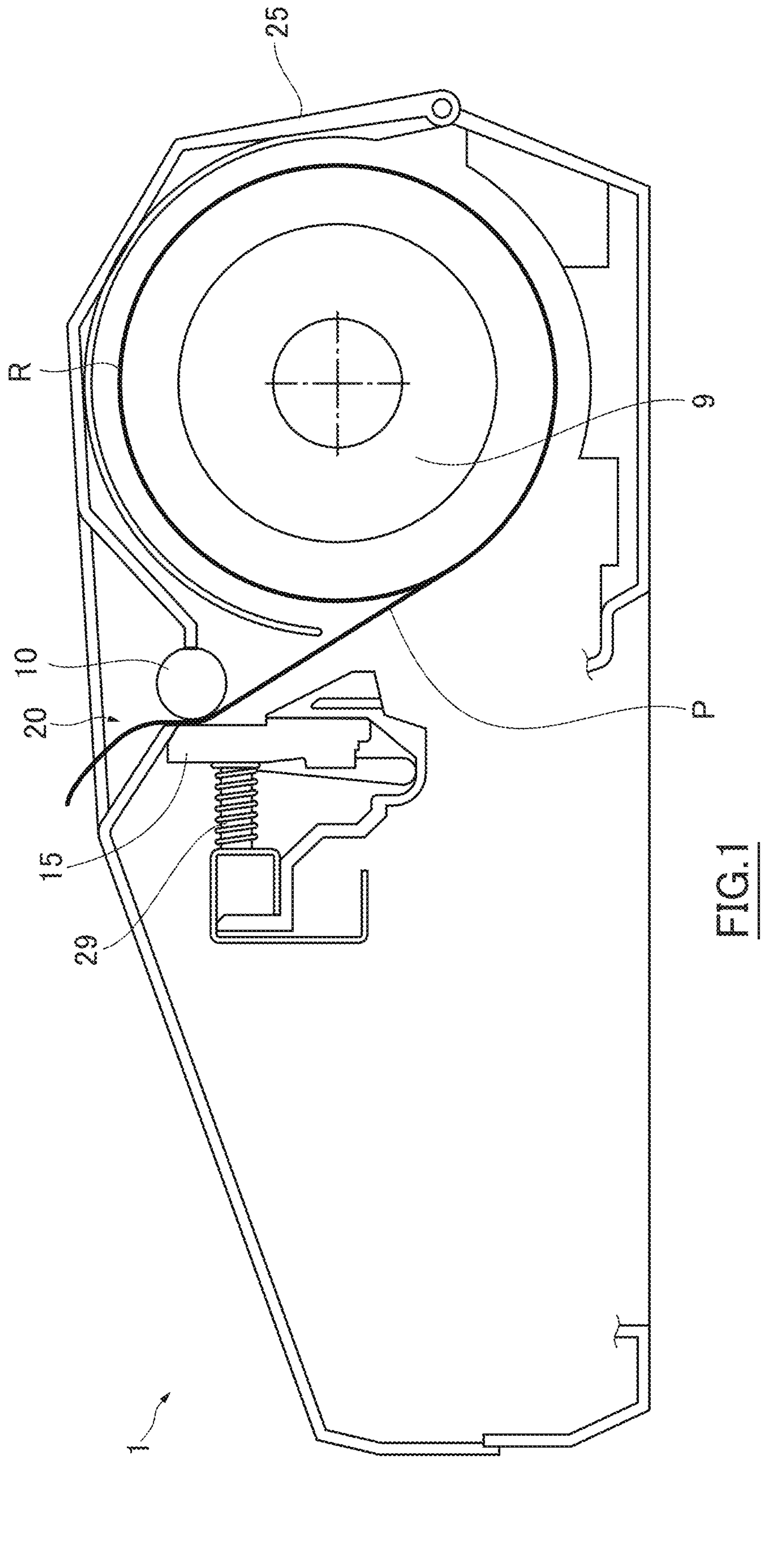
FIG. 1 is a schematic sectional view of a printer for explaining a printing operation of a printer of an embodiment.

A printer 1 according to an embodiment is illustrated in FIG. 1. The printer 1 is a thermal printer that prints labels having a thermal color developing layer on one side.

As shown in FIG. 1, the printer 1 includes a paper roll-containing chamber 9, a platen roller 10, a thermal head 15, a printer cover 25, and a coil spring 29. A paper roll "R" can be filled in the paper roll-containing chamber 9 by opening and closing the printer cover 25.

The paper roll "R" is a strip continuous paper "P" that is wound into a roll shape. Although not shown, in an embodiment, the continuous paper "P" includes, for example, a strip release paper and a plurality of labels that are temporarily attached on the release paper at predetermined intervals. A label adherend surface of the release paper is coated with a release agent, such as silicone, in order to easily peel off labels.

In another embodiment, the continuous paper "P" may be a label without a release paper.

As shown in FIG. 1, the printer 1 supports the platen roller 10 in a manner rotatable in forward and reverse directions. The platen roller 10 is a feeding unit for feeding the continuous paper "P" pulled out of the paper roll "R" and is formed in such a manner as to extend along a width direction of the continuous paper "P." A gear (not shown) is provided at an end of a platen shaft of the platen roller 10 and is mechanically connected to a roller-driving stepping motor (not shown). The platen roller 10 rotates in accordance with rotation of the stepping motor that operates based on a signal transmitted from a circuit board (not shown).

The thermal head 15 is a print unit for printing information such as characters, symbols, figures, or bar codes, on labels on the continuous paper "P." The thermal head 15 includes a plurality of heating elements (heating resistors) that are arranged along the width direction of the continuous paper "P," and it performs printing by selectively energizing the plurality of heating elements based on signals transmitted from the circuit board.

The thermal head 15 is disposed so as to face the platen roller 10 and nip the continuous paper "P" in cooperation with the platen roller 10 when the printer cover 25 is in a closed state. The coil spring 29 is a biasing member that biases the thermal head 15 to the platen roller 10 and generates a nip pressure appropriate for printing, between the thermal head 15 and the platen roller 10.

In the following description, a direction perpendicular to a feeding direction of the continuous paper "P" (that is, a direction in which the heating elements are arranged) is referred to as a "main scanning direction," and the same direction as the feeding direction of the continuous paper "P" is referred to as a "sub-scanning direction."

Further details of the thermal head 15 will be described later.

Figure 2:
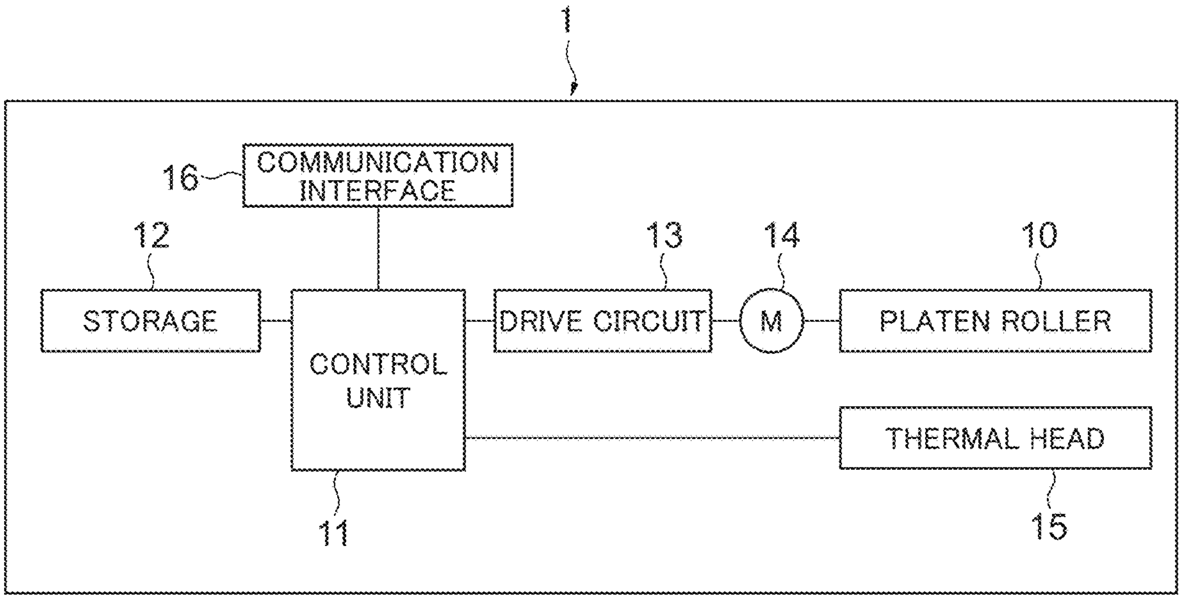
FIG. 2 is a functional block diagram of the printer of an embodiment.

Next, an internal configuration of the printer 1 will be described with reference to FIG. 2. FIG. 2 is a block diagram showing an internal configuration of the printer 1.

As shown in FIG. 2, the printer 1 includes, for example, a control unit 11, a storage 12, a drive circuit 13, a motor 14 that is mechanically coupled to the platen roller 10, a thermal head 15, and a communication interface (I/F) 16.

The control unit 11 includes a controller and a memory and controls operation of the printer 1. A processor reads and executes firmware that is stored in a ROM, in starting up the printer 1.

The controller includes a central processing unit (CPU), as described later, and it executes firmware to control the thermal head 15 to print predetermined information on labels.

The storage 12 is a storage device, such as a solid state drive (SSD). The storage 12 stores a print file that is obtained from a host computer via the communication interface 16, for example. The storage 12 may store information of a print format that is used in printing information on each label.

The drive circuit 13 is a circuit for driving the motor 14, which controls rotation of the platen roller 10, in accordance with a feed request from the control unit 11. The motor 14 is, for example, a stepping motor. The feed request contains, for example, information of a feeding direction (forward direction or reverse direction) and a feeding amount (e.g., the number of steps).

The control unit 11 executes printing processing by controlling to selectively supply current to each heating element of the thermal head 15 based on image data to be printed. The image data is data in which a print file is written in bitmap data. The heating element of the thermal head 15, which generates heat by electric current, is pressed against a label on the continuous paper P that is fed by the platen roller 10. Then, the thermal color developing layer of the label, against which the heating element is pressed, develops color, whereby information is printed on the label.

The communication interface 16 includes a communication circuit for communicating with an external device, such as a host computer.

Figure 3:
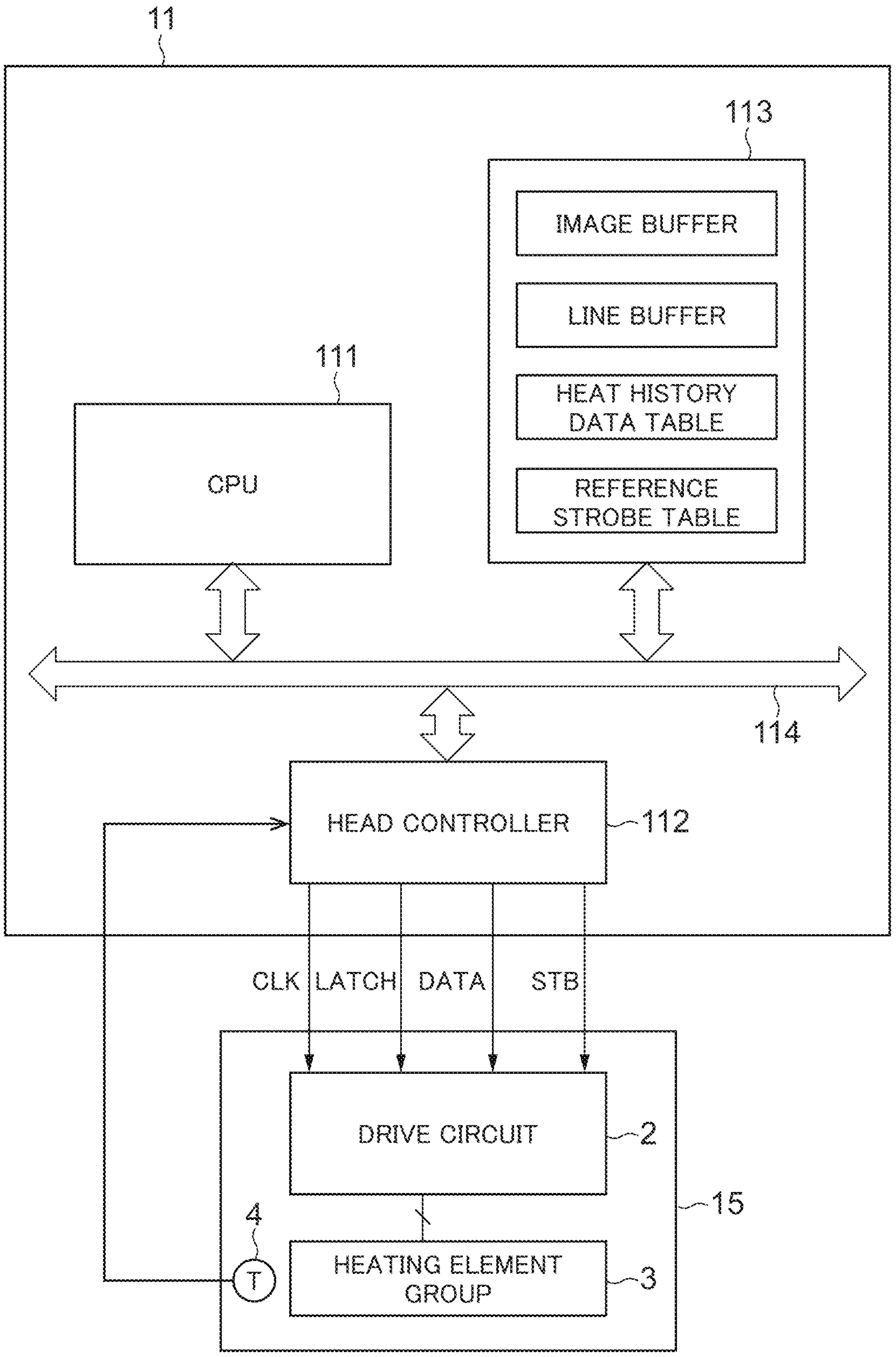
FIG. 3 is a functional block diagram focusing on a control unit and a thermal head of a printer of an embodiment.
Figure 4:
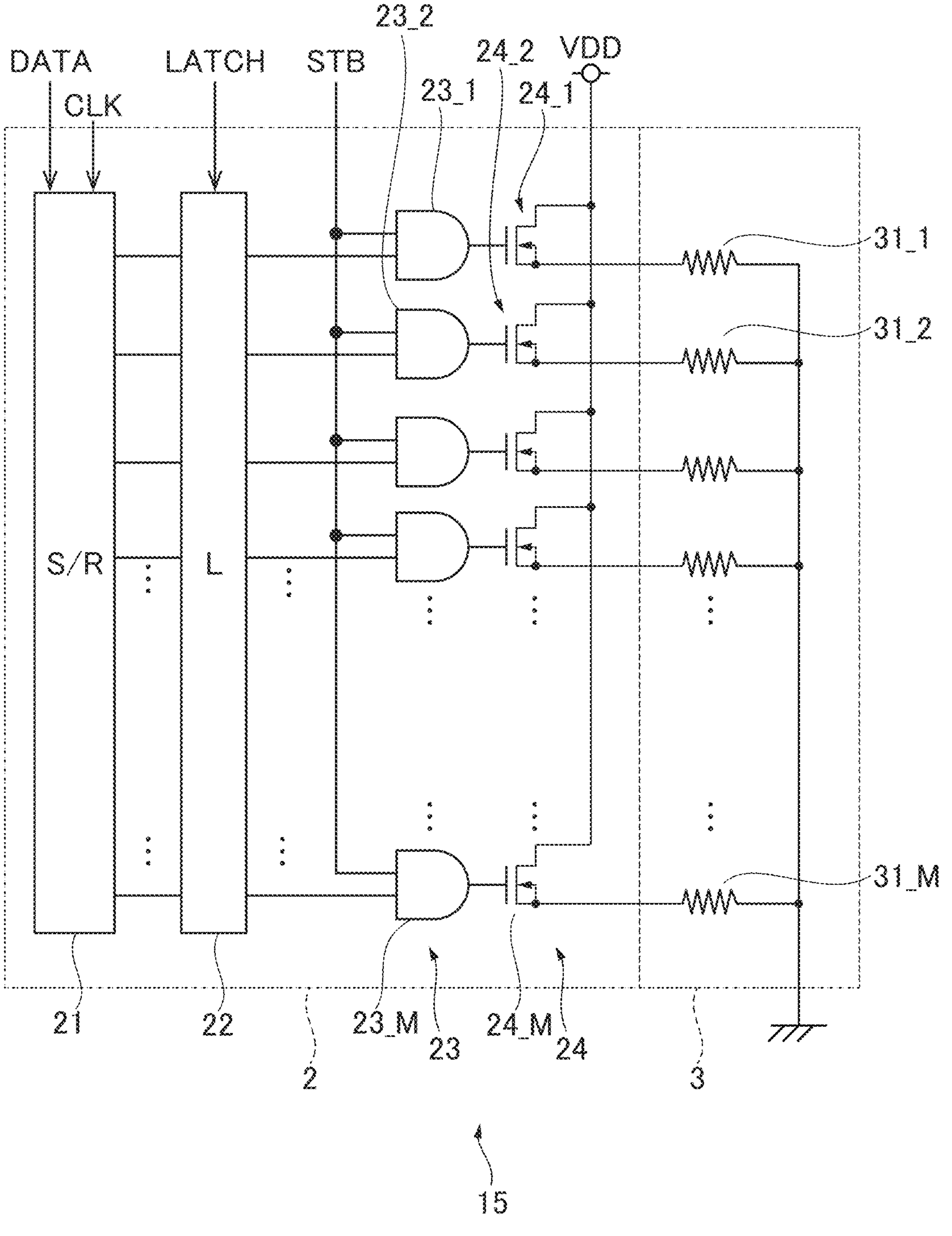
FIG. 4 is a schematic circuit diagram of the thermal head of an embodiment.

Next, a printing operation of the printer 1 will be described with reference to FIGS. 3 and 4. FIG. 3 is a functional block diagram focusing on the control unit and the thermal head of the printer 1 of an embodiment. FIG. 4 is a schematic circuit diagram of the thermal head 15 of an embodiment.

As shown in FIG. 3, the control unit 11 includes a CPU 111, a head controller 112, and a memory 113, and they are capable of communicating with one another via a bus 114.

The CPU 111 controls the whole printing operation of the control unit 11. The head controller 112 supplies each type of signal for printing, to the thermal head 15, under control of the CPU 111.

The signals that are supplied to the thermal head 15 by the head controller 112 include a clock pulse CLK, a latch pulse LATCH, a data signal DATA, and a strobe signal STB.

The memory 113 (an example of a storage) is, for example, a random access memory (RAM), and it includes a first-in first-out (FIFO) image buffer, a line buffer, a heat history data table, and a reference strobe table.

In an embodiment, the CPU 111 executes printing by performing heat history control. The heat history control is control for causing thermal energy in the heating element to be constant by adjusting a length of a strobe application period, which is a pulse width of energizing current. This adjustment is performed based on one or both of data of current that was supplied to the heating element in the past and data of current that will be supplied to the heating element in the future.

In order to perform the heat history control, the CPU 111 generates data by converting original image data to be printed, based on print data of a target dot in the original image data and on print data of dots around the target dot. This generated data is referred to as "heat history-reflected data," hereinafter. The heat history-reflected data is stored in the image buffer.

In the following description, the term "image data" means original image data before it is converted into the heat history-reflected data.

In the heat history control, a data signal and a corresponding strobe signal are generated multiple times during one scanning line time (that is, a scanning line time of one line). In the example described later, a data signal and a strobe signal are generated four times during one scanning line time. In this case, for example, assuming that an M number of heating elements are arranged in a line in the thermal head 15, and data for one line (line data) in image data is M bits, data for one line (line data) of the heat history-reflected data is M×4 bits data.

The line data in image data contains print data that indicates whether to print each dot. The print data shows one of "printing" and "non-printing."

On the other hand, data of each dot in line data of the heat history-reflected data corresponding to data for one line in image data is equivalent to data signals of multiple times, and it indicates one of "energizing" and "non-energizing."

The line buffer sequentially stores line data of the heat history-reflected data.

As described above, the heat history data table is referred to in generating the heat history-reflected data.

The heat history data table shows relationships among those as follows: print data of a dot to be processed (hereinafter referred to as a "target dot") in a line to be printed in image data (hereinafter referred to as a "target line"), print data of dots corresponding to the target dot, in previous and next lines of the target line (that is, print data in the past and print data in the future), and strobe levels for the target dot during a scanning line time.

Herein, the strobe level represents a level (namely, high level or low level) of a data signal in each strobe application period with respect to a heating element corresponding to a target dot. The level of the data signal shows whether to apply a pulse of energizing current in each strobe application period. The strobe level shows the length of time during which current is substantially supplied to the heating element during a scanning line time. As the strobe level is higher, the time during which current is supplied to the heating element is longer during a scanning line time, and a greater thermal energy is applied to the heating element.

The CPU 111 refers to the heat history data table to determine the level (high level showing "energizing" or low level showing "non-energizing") of a data signal in each strobe application period, with respect to each dot in a target line. This results in appropriately controlling thermal energy to be applied to the heating element that corresponds to a current target dot, in consideration of print data of the current target dot and print data of the dots in the previous and next lines.

In another embodiment, the heat history data table also includes relationships between print data of each dot adjacent to a target dot and strobe levels for the target dot during a scanning line time. The thermal energy that is received from heating elements adjacent to a heating element corresponding to the target dot is also considered by referring to the print data of right and left dots adjacent to the target dot. This enables more appropriately controlling thermal energy to be provided to the heating element corresponding to the current target dot.

The head controller 112 generates a data signal DATA based on line data that is sequentially transferred from the line buffer and also generates a strobe signal STB at predetermined times. Transfer of line data from the line buffer to the head controller 112 is performed, for example, by direct memory access (DMA).

As shown in FIG. 3, the thermal head 15 includes a drive circuit 2, a heating element group 3, and a thermistor 4 (an example of a temperature measuring unit).

The heating element group 3 includes a plurality of heating elements (heating resistors) that are arranged on a line.

The drive circuit 2 selectively supplies current to each heating element of the heating element group 3 to cause them to generate heat, based on each type of signal supplied from the head controller 112. The thermistor 4 measures temperature of the thermal head 15 (namely, thermal head temperature).

Details of examples of structures of the drive circuit 2 and the heating element group 3 are described as follows.

As shown in FIG. 4, the drive circuit 2 of an embodiment includes, at least, a shift register (S/R) 21 for temporarily storing data signals DATA for one line, a latch circuit (L) 22, a gate circuit group 23, and a transistor group 24.

The heating element group 3 includes heating elements (heating resistors) 31_1 to 31_M.

The drive circuit 2 is operated by a data signal DATA, a clock pulse CLK, a latch pulse LATCH, and a strobe signal STB. These data and signals are input or transferred from the head controller 112. The data signals DATA for one line may be transferred by dividing them with the use of a plurality of line buffers, in order to shorten the transfer time. In this case, a divided part of the data signals DATA for one line is stored in each line buffer and is serially transferred from each line buffer.

In the drive circuit 2 in FIG. 4, the strobe signal STB is a positive logic signal; that is, a heating element is supplied with current and generates heat when the signal is high level. In another embodiment, the strobe signal STB may be a negative logic signal; that is, a heating element is supplied with current and generates heat when the signal is low level.

The shift register 21 receives data signals DATA for one line synchronously with a clock pulse CLK and stores them. The data signal DATA (an example of a pulse of energizing current) contains bit strings in which each bit is high level in the case of "energizing" and is low level in the case of "non-energizing." The latch circuit 22 is connected in parallel to the shift register 21, and it receives the bit strings in the shift register 21 simultaneously in parallel and latches them. Transfer timing of data from the shift register 21 to the latch circuit 22 is controlled by a latch pulse LATCH.

The gate circuit group 23 includes gate circuits (AND circuits) 23_1, 23_2, . . . , and 23_M that respectively correspond to a first dot to a M-th dot in one line. One of input terminals of each gate circuit is supplied with a strobe signal STB, and the other input terminal of each gate circuit is connected to output of the latch circuit 22.

Each gate circuit of the gate circuit group 23 outputs a logical product of the strobe signal STB and a corresponding data signal DATA.

The transistor group 24 includes MOS transistors 24_1 to 24_M. Each MOS transistor turns on and off in accordance with output from a corresponding gate circuit.

While the strobe signal STB is high level, a logic level of an output terminal of each gate circuit of the gate circuit group 23 coincides with an output level of the latch circuit 22. For example, when an output level of the latch circuit 22 is high, which shows "energizing," the output from a corresponding gate circuit is also high level, whereby a corresponding MOS transistor turns on, and current flows to the heating element 31. Conversely, when an output level of the latch circuit 22 is low, which shows "non-energizing," the output from a corresponding gate circuit is also low level, whereby a corresponding MOS transistor turns off, and current does not flow to the heating element 31.

In a case of using a negative logic signal as the strobe signal STB, the following structure can be used.

Specifically, in the structure in FIG. 4, a NAND circuit may be used instead for each gate circuit of the gate circuit group 23, and an inverted signal of the strobe signal STB is input to the NAND circuit. Thus, when the strobe signal STB is low level, the NAND circuit outputs an inverted signal of output of the latch circuit 22. A corresponding MOS transistor is configured to turn on to cause current to flow to the heating element when output of the NAND circuit is low level.

In a case in which the heat history control is not performed, a data signal DATA is sent once to the drive circuit 2 of the thermal head 15 during a scanning line time, with respect to line data for one line. On the other hand, in the case of performing the heat history control, data signals DATA (e.g., data signals DATA1 to DATA4 described later) are sent to the drive circuit 2 of the thermal head 15 in a plurality of periods during a scanning line time, with respect to line data for one line.

In an embodiment, the head controller 112 supplies a data signal four times, which are data signals DATA1 to DATA4, to the drive circuit 2 at predetermined times synchronized with clock pulses CLK, during a scanning line time.

Assuming that data for one line in image data is M bits, corresponding line data of the heat history-reflected data is M×4 bits data. Each M bits data in this M×4 bits data are supplied to the drive circuit 2 at different four times as the data signals DATA1 to DATA4.

The head controller 112 supplies latch pulses LATCH and strobe signals STB1 to STB4 to the drive circuit 2 of the thermal head 15, at predetermined times synchronized with clock pulses CLK. The relationship between the transfer timing of the data signal and the application timing of the strobe signal during one scanning line time in the heat history control will be described later.

Figure 5:
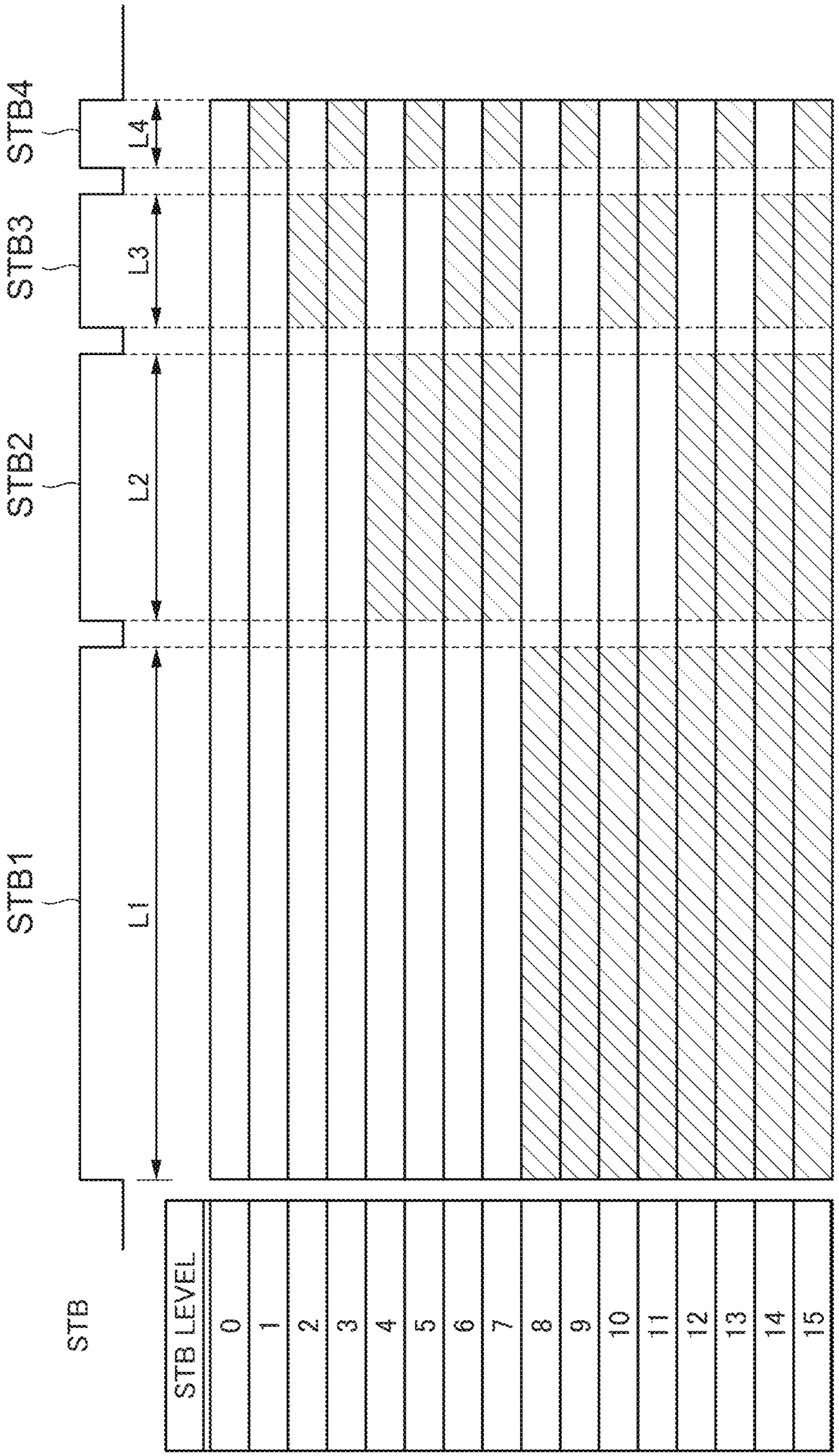
FIG. 5 shows relationships between a strobe level and timing when current substantially flows to a heating element in each period of applying a strobe signal during a scanning line time, in printing control of an embodiment.

FIG. 5 shows relationships between a strobe level (STB level) and a strobe pattern, or timing when current substantially flows to the heating element in a period of applying each of strobe signals STB1 to STB4 during a scanning line time, in the heat history control of an embodiment. A period of applying each of strobe signals is referred to as a "strobe period" as appropriate, hereinafter.

In a case of a thermal head of positive logic, the state in which current substantially flows in the heating element means that corresponding data signals DATA1 to DATA4 are high level. That is, the data signals DATA1 to DATA4 correspond to the strobe level.

For example, data signals DATA1 to DATA4 corresponding to a target dot are four bits data corresponding to the strobe level. In this case, the data signals DATA1 to DATA4 as a whole may be "0000" when the strobe level is "0," "0110" when the strobe level is "6," and "1111" when the strobe level is "15."

In an embodiment, when the strobe level is four or greater, thermal energy for changing the color of the thermal color developing layer of a label is applied to the heating element. On the other hand, when the strobe level is less than four, thermal energy for changing the color of the thermal color developing layer of a label is not applied, but instead, an effect for preheating the heating element is obtained.

In an embodiment, as shown in FIG. 5, the four strobe signals STB1 to STB4 corresponding to the four data signals are set in the order from a long period to a short period, during a scanning line time. That is, assuming that the lengths (strobe lengths) of the four strobe signals STB1 to STB4 are respectively represented by L1 to L4, a relationship "L1>L2>L3>L4" is satisfied.

The ratio of the lengths of the four strobe signals STB1 to STB4 is preferably 8:4:2:1. Setting the ratio of the lengths in this manner enables increasing the number of combinations of times to apply thermal energy to the heating element (that is, the strobe lengths) during one scanning line time, as great as possible, whereby energy to be applied can be finely set. The ratio of the lengths of the four strobe signals STB1 to STB4 is not limited to 8:4:2:1; but 16 ($=2^4$) patterns of strobe lengths that are different from each other can be set by varying the lengths from each other.

The CPU 111 refers to the heat history data table to determine the strobe level, with respect to each target dot in target line data. The CPU 111 generates heat history-reflected data by allocating four bits data corresponding to the strobe level, to each target dot.

The head controller 112 respectively allocates the first to the fourth bits data to the data signals DATA1 to DATA4, with respect to each target dot of the line data in the heat history-reflected data.

Next, a preferable method for determining print speed and a strobe length will be described.

In an embodiment, the CPU 111 determines strobe lengths L1 to L4 of the strobe signals STB1 to STB4 in accordance with print speed and optical density by referring to the reference strobe table.

FIG. 6 shows an example of data components of the reference strobe table.

As shown by the example in FIG. 6, the reference strobe table describes 50 strobe patterns of strobe lengths L1 to L4 for combinations of print speed (e.g., 2 to 6 inches per second (IPS)) and optical density (1A to 10A). The following describes print speed and optical density that are defined in the reference strobe table, as "speed set value" and "density set value," respectively.

The reference strobe table is a reference for correcting density, which will be described later, and it shows strobe lengths under the condition that the thermal head temperature is 25° C., the battery voltage is the maximum voltage $V_{MAX}$, and the number of simultaneously printing dots is one.

In the reference strobe table, density increases (or becomes high) as the density set value increases from 1 A to 10 A. Each of the numbers of the speed set values and the density set values is not limited; but in the example shown in FIG. 6, five levels are set for the speed set value, and ten levels are set for the density set value, whereby 50 patterns of the strobe lengths L1 to L4 are set. The lengths of the strobe lengths L1 to L4 are not limited, but may have a ratio of 8:4:2:1, as described above. The speed set values in five levels are examples of a plurality of print speeds.

Although the scanning line time is described for reference in the reference strobe table shown in FIG. 6, it is not necessary to contain the scanning line time in the reference strobe table. The length for one line in a label to be printed is already known, and thus, the scanning line time is uniquely determined in accordance with the speed set value.

As shown in FIG. 6, as the speed set value is higher, the scanning line time is shorter, and each strobe length is thereby shortened in order to contain all of the strobe lengths L1 to L4 in the scanning line time. In addition, as the density set value is higher, necessary thermal energy is increased, and each strobe length is thereby extended.

Figure 7:
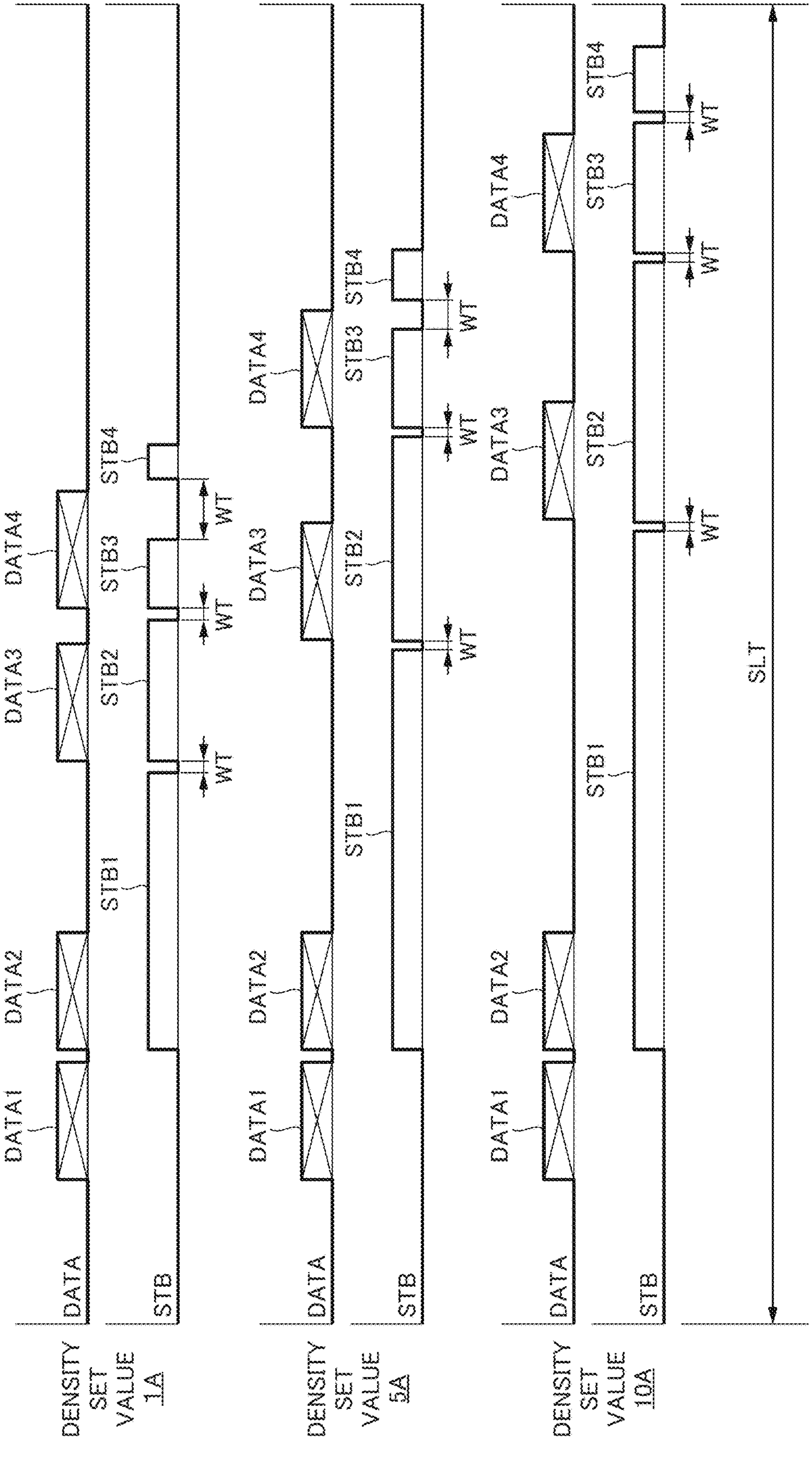
FIG. 7 shows timing diagrams showing transfer timing of data signals and application timing of strobe signals during a scanning line time, in a printer of an embodiment.

In the reference strobe table, the density set value is a relative set value representing contrast at a speed set value. Thus, when the speed set value is varied, optical density that is actually obtained (in other words, the degree of contrast in actually printing a label) is varied accordingly although the density set value is not changed. For example, optical density that is obtained at the density set value of 5 A when the speed set value is 2 IPS, is different from that when the speed set value is 3 IPS. FIG. 7 shows transfer timing of the data signals DATA1 to DATA4 and application timing of the strobe signals STB1 to STB4 in printing by performing the heat history control in an embodiment. FIG. 7 shows timing diagrams showing the transfer timing of the data signal and the application timing of the strobe signal during a scanning line time SLT. As shown in FIG. 7, a wait time WT is set between successive strobe application periods.

In an embodiment, the CPU 111 refers to the reference strobe table to determine timing, which is shown as an example in FIG. 7, prior to printing. Herein, the scanning line time SLT is determined by the speed set value. As shown by the reference strobe table in FIG. 6, the strobe length of each of the four strobe signals STB1 to STB4 in the case of the density set value of 1 A, is shorter than that in the case of the density set value of 5 A (default setting). Conversely, the strobe length of each of the four strobe signals STB1 to STB4 in the case of the density set value of 10 A, is longer than that in the case of the density set value of 5 A (default setting).

Next, a method for determining print speed of the printer 1 of an embodiment will be described.

In an embodiment, actual print speed is not set to be one of the plurality of speed set values in the reference strobe table, but it is varied from the speed set value based on a print target image and operating environments (e.g., battery voltage).

In an embodiment, the print speed is adjusted by an increment of speed (an example of a second increment of speed; e.g., 1 mm/second) less than an increment of speed of the plurality of speed set values defined in the reference strobe table (an example of a first increment of speed; 1 IPS in the example in FIG. 6). A print target image is printed at the adjusted constant print speed. That is, one page containing a print target image is printed at the adjusted constant print speed.

With this method, although actual print speed is a best-effort print speed due to the possibility of being different from the speed set value, print quality of the whole label is improved. Hereinafter, this method for determining print speed is referred to as a "continuously variable speed method."

In the continuously variable speed method, the print speed is adjusted before printing is started and is not varied during printing.

As described later, in an embodiment, density is corrected in accordance with parameters such as operating environments of the printer 1 and a layout of a print target image, in order to prevent print quality from being degraded. This density correction involves correcting a strobe length per line in accordance with operating environments such as battery voltage and thermal head temperature, a number of simultaneously printing dots in one line in a print target image, and so on. At this time, the print speed is adjusted by analyzing the print target image prior to printing, so that a length of a strobe signal will be contained in a scanning line time for one line even when the corrected strobe length is the maximum.

Figure 8A:
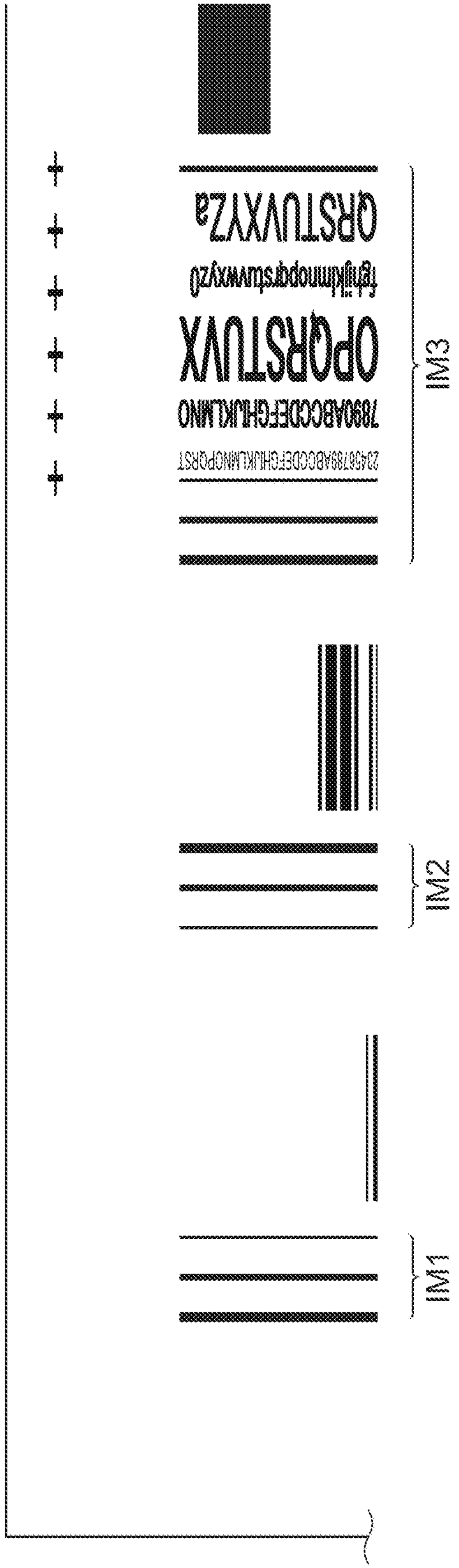
FIG. 8A shows a part of an exemplary image for explaining a method for controlling print speed of each of an example and a comparative example.
Figure 8B:
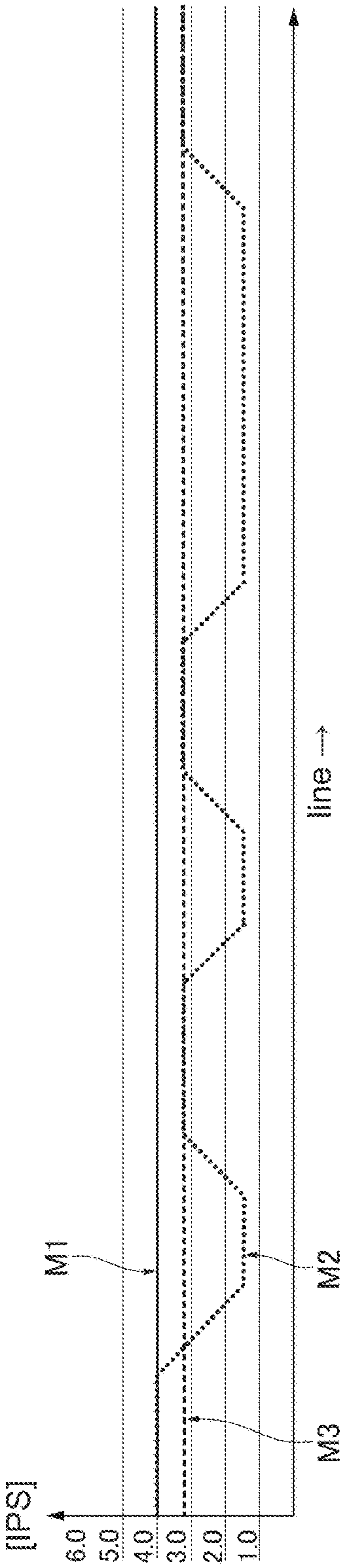
FIG. 8B shows print speeds that are varied with the lapse of time in different print speed determination methods, in printing the image shown in FIG. 8A.

The advantage of determining the print speed by the continuously variable speed method will be described with reference to FIGS. 8A and 8B, by comparing with existing print speed determination methods. FIG. 8A shows a part of an exemplary image. FIG. 8B shows print speeds that are varied over time (that is, in the main scanning direction) in different print speed determination methods in printing the image shown in FIG. 8A.

Herein, "stepwise constant-speed method" and "stepwisely varying speed method" are described as existing print speed determination methods. The stepwise constant-speed method is a simplest speed determination method and determines print speed in accordance with a speed set value set by a user among a plurality of speed set values or a speed set value set as default.

The stepwisely varying speed method varies print speed per unit of line to one of a plurality of speed set values that are set in advance, in accordance with a necessary strobe length as a result of correcting density.

In FIG. 8B, a print speed in the case of the stepwise constant-speed method is shown by a reference sign "M1," a print speed in the case of the stepwisely varying speed method is shown by a reference sign "M2," and a print speed in the case of the continuously variable speed method is shown by a reference sign "M3."

In FIG. 8A, the print target image includes image parts IM1 to IM3 in which the number of simultaneously printing dots in one line is relatively great. For example, the image parts IM1 to IM3 contain straight lines that are typical examples of a case in which the number of simultaneously printing dots is great in the sub-scanning direction.

With reference to FIG. 8B, the stepwise constant-speed method (M1) performs printing all lines at a predetermined speed set value (4 IPS in the case in FIG. 8B). Thus, in order to make the optical density uniform in the whole image, a user needs to select an optimal speed set value in advance in accordance with a print target image and operating environments such as battery voltage. This is, however, not feasible and can cause reduction in print quality. For example, the strobe length should be increased by correcting density in order to obtain necessary optical density in some cases. In this case, however, if the increased strobe length cannot be contained in a scanning line time corresponding to a predetermined speed set value, necessary thermal energy cannot be applied to the heating element, resulting in reduction in optical density.

In the stepwisely varying speed method (M2), print speed is controlled so as to be relatively low for a line in which the number of simultaneously printing dots is great as in the image parts IM1 to IM3 and to be relatively high for other image parts (that is, image parts composed of lines in which the number of simultaneously printing dots is small). For example, printing is performed at a high speed by collectively printing a line in which the number of simultaneously printing dots is relatively small, whereas printing is performed at a low speed by separately printing a line in which the number of simultaneously printing dots is relatively great. The separate printing is a method for printing one line by dividing it into a plurality of pieces. In a case of dividing one line into two pieces, print speed is reduced to half by simple calculation. For this reason, in the stepwisely varying speed method (M2), throughput may be greatly reduced (that is, the time required to print the whole image may be increased) depending on a layout of the whole print target image.

In addition, in a case in which there are few blank parts in the main scanning direction, print speed may not be returned to a desired speed, and printing may be performed while the speed is still being varied. While the speed is being varied, a relationship between the print speed and the strobe length is unbalanced, in other words, a relationship between a turning-on (heat application) time and a turning-off (cooling) time is unbalanced. This causes uneven optical density and reduction in print quality.

In short, the stepwisely varying speed method has the possibility that throughput and image quality are reduced depending on a printing layout.

The continuously variable speed method (M3) of an embodiment differs from the existing stepwise constant-speed method and the existing stepwisely varying speed method, and it enables optical density to be uniform in the whole image and improving print quality of labels. The following describes details of this continuously variable speed method.

First, the density correction of an embodiment will be described with reference to FIGS. 9 and 10. As described above, the density correction involves correcting a strobe length per line in accordance with operating environments such as battery voltage, the number of simultaneously printing dots in one line in a print target image, and so on.

In an embodiment, the density correction involves battery voltage-based correction for correcting a strobe length based on battery voltage.

In consideration that the power applied to the heating element 31 of the thermal head 15 is decreased due to reduction in battery voltage, the battery voltage-based correction is performed so as to compensate for the decreased applied power by extending the strobe length.

The battery voltage-based correction is performed, for example, by referring to a battery voltage-based correction table shown in FIG. 9.

As shown in FIG. 9, the battery voltage-based correction table describes a battery voltage and a voltage-based correction ratio that are associated with each other. The voltage-based correction ratio is a value that is to be multiplied with a strobe length described in the reference strobe table, in the battery voltage-based correction. A reference battery voltage is the maximum voltage $V_{MAX}$, and the voltage-based correction ratio thereof is 100%. In this state, the strobe length that is described in the reference strobe table is not varied.

The battery voltage-based correction table describes the voltage-based correction ratio so that it will increase as the battery voltage decreases. Thus, in the battery voltage-based correction, the strobe length is corrected to be longer than that described in the reference strobe table as the battery voltage decreases.

In a non-limiting example, the maximum voltage $V_{MAX}$ is approximately 16 to 17 V, the minimum voltage $V_{MIN}$ is approximately 12 to 13 V, and the voltage is set in steps of 0.01 to 0.05 V.

It is not necessary to refer to the battery voltage-based correction table in the battery voltage-based correction. Alternatively, the voltage-based correction ratio may be calculated by using a known function that specifies a relationship between the battery voltage and the battery voltage-based correction ratio. In this case, the function specifies a relationship between the battery voltage and the voltage-based correction ratio so as to compensate the amount of heat to be applied corresponding to a difference between the maximum voltage $V_{MAX}$ and a current battery voltage, by extending the strobe period.

In an embodiment, the density correction involves head voltage drop-based correction and supply voltage drop-based correction for correcting the strobe length based on the number of simultaneously printing dots.

In the thermal head 15, as the number of simultaneously printing dots in one line (coverage rate in one line) increases, power to be applied to the heating element 31 decreases due to voltage drop caused by ON resistance (e.g., ON resistance of the MOS transistor in FIG. 4), conduction resistance, and so on in the circuit. In view of this, the head voltage drop-based correction is performed so as to compensate for the decreased applied power by extending the strobe length.

On the other hand, as the number of simultaneously printing dots increases in one line, a peak current flowing in the thermal head 15 increases to cause source voltage drop, resulting in reduction in power applied to the heating element 31. In view of this, the source voltage drop-based correction is performed so as to compensate for the decreased applied power by extending the strobe length.

The head voltage drop-based correction and the source voltage drop-based correction are performed, for example, by referring to a number-of-dots-based correction table shown in FIG. 9. In an embodiment, a number-of-dots-based correction table is individually prepared for each of the head voltage drop-based correction and the source voltage drop-based correction.

As shown in FIG. 9, the number-of-dots-based correction table describes the number of simultaneously printing dots and a number-of-dots-based correction ratio that are associated with each other. The number-of-dots-based correction ratio is a value that is to be multiplied with a strobe length described in the reference strobe table, in the head voltage drop-based correction and the source voltage drop-based correction. A reference number of simultaneously printing dots is "1," and the voltage-based correction ratio thereof is 100%. In this state, the strobe length that is described in the reference strobe table is not varied.

The number-of-dots-based correction table describes the number-of-dots-based correction ratio so that it will increase as the number of simultaneously printing dots increases. Thus, in the head voltage drop-based correction and the source voltage drop-based correction, the strobe length is corrected to be longer than that described in the reference strobe table as the number of simultaneously printing dots increases.

In an embodiment, the density correction involves head temperature-based correction for correcting the strobe length based on thermal head temperature. The thermal head temperature is measured by the thermistor 4 (FIG. 3).

The head temperature-based correction is performed in order to reduce variations in optical density due to variations in temperature of the thermal head 15, as much as possible. The head temperature-based correction is performed, for example, by referring to a temperature-based correction table shown in FIG. 10.

As shown in FIG. 10, the temperature-based correction table describes thermal head temperature and a temperature-based correction ratio that are associated with each other. The temperature-based correction ratio is a value that is to be multiplied with a strobe length described in the reference strobe table, in the head temperature-based correction. A reference thermal head temperature is 25° C., and the temperature-based correction ratio thereof is 100%. In this state, the strobe length that is described in the reference strobe table is not varied.

The temperature-based correction table describes the temperature-based correction ratio so that it will increase as the thermal head temperature decreases and that it will decrease as the thermal head temperature increases. Thus, in the head temperature-based correction, the strobe length may be made longer or shorter than that described in the reference strobe table, depending on the thermal head temperature.

It is not necessary to refer to the temperature-based correction table in the head temperature-based correction. Alternatively, a function may be defined by assuming a linear relationship between the thermal head temperature and the temperature-based correction ratio. In one example, the temperature-based correction ratio may be defined in advance as a linear function of a difference between a reference value of the thermal head temperature (in the example in FIG. 10, 25° C.) and a current value (measured value) of the thermal head temperature.

The density correction of an embodiment involves at least one of the battery voltage-based correction, the head voltage drop-based correction, the source voltage drop-based correction, and the head temperature-based correction.

In performing the density correction as described above, the strobe length that is made longer than that described in the reference strobe table may not be contained in the current scanning line time. In consideration of this, the continuously variable speed method performs a simulation of the density correction prior to printing. Then, the continuously variable speed method controls to reduce the print speed from the speed set value so that the strobe length will be contained in a scanning line time even when the strobe length is maximum due to the density correction. That is, this control is performed to prevent variations in print quality due to the strobe length that is not contained in a scanning line time because of operating environments, such as battery voltage, and a layout of a print target image.

Moreover, as a result of intensive research by the inventor of the present invention, the following findings (I) and (II) have been obtained.

(I) Optical density is determined mainly by a ratio of a continuous pulse time in a scanning line time (hereinafter referred to as "density ratio").

Herein, the term "continuous pulse time" means a length of a strobe period for applying thermal energy that causes the thermal color developing layer to develop color. In the example shown in FIG. 5, the continuous pulse time means a length of a period from timing of a rising edge of the strobe signal STB1 to a falling edge of the strobe signal STB2 (an example of a first application period).

(II) Optical density tends to increase as the print speed is lower although the density ratio is not varied.

For example, assuming, in the reference strobe table shown in FIG. 6, that the density ratio for the density set value of 5 A (reference) is set so as to not greatly differ among a plurality of speed set values, optical density that is actually obtained is higher as the speed set value is lower. Thus, in order to prevent the optical density from varying in reducing the print speed from the speed set value, the density ratio needs to be decreased in accordance with reduction of the print speed.

Figure 11:
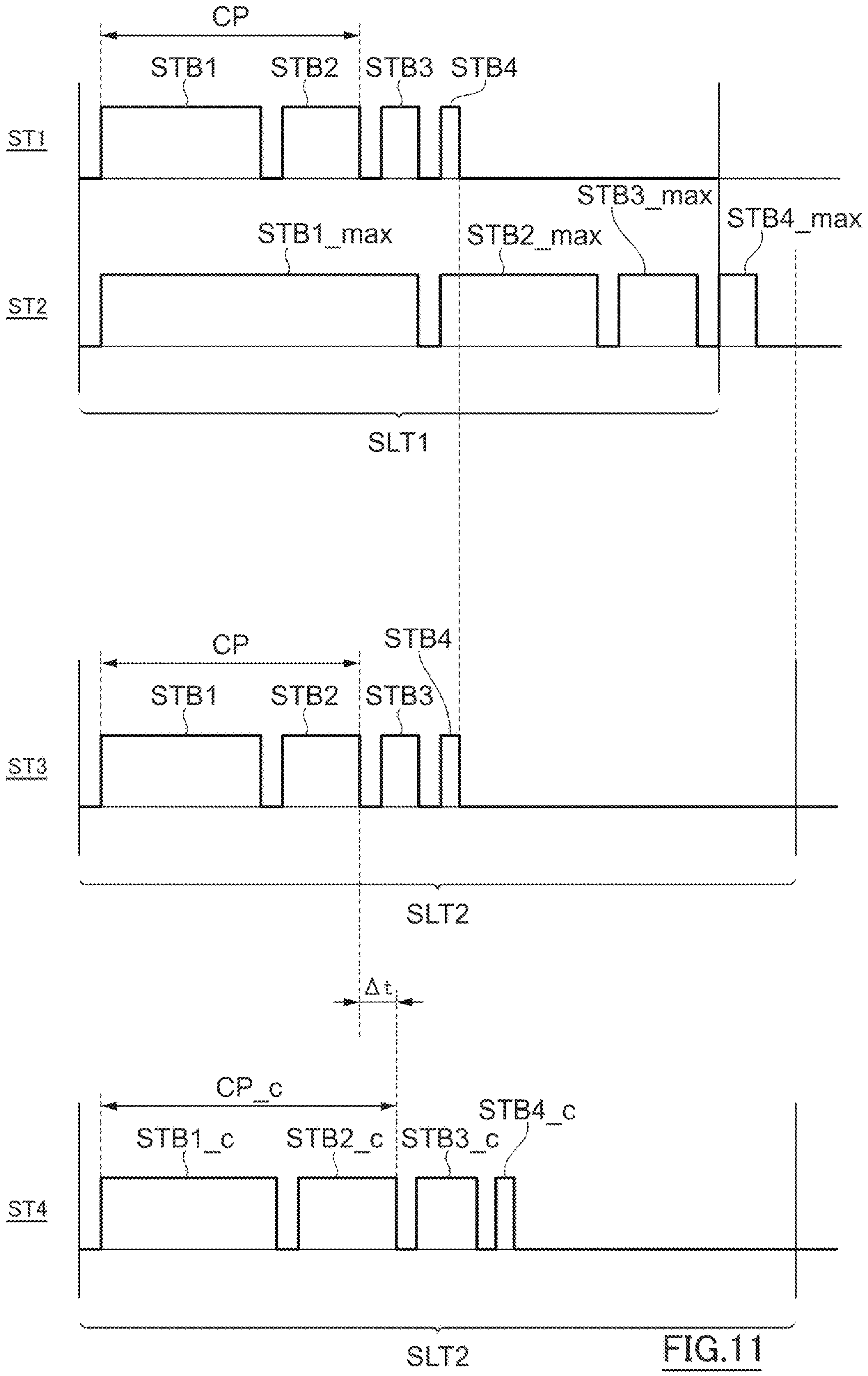
FIG. 11 illustrates a continuously variable speed method in a printer of an embodiment.

In consideration of these findings (I) and (II), the continuously variable speed method executes a speed-reduction correction process of the print speed in accordance with result of executing the simulation of the density correction prior to printing, and it also executes a density ratio correction process in accordance with the corrected print speed. These speed-reduction correction process and density ratio correction process will be described with reference to FIG. 11. FIG. 11 illustrates the speed-reduction correction process and the density ratio correction process in the continuously variable speed method.

With reference to FIG. 11, the state ST1 shows strobe signals STB1 to STB4 at the speed set value and the density set value that are set immediately before printing, in the reference strobe table. A scanning line time SLT1 is determined in accordance with the speed set value. In FIG. 11, the state ST1 shows a continuous pulse time CP containing the application periods of the strobe signals STB1 and STB2.

The state ST2 in FIG. 11 shows a result of performing the simulation of the density correction on the strobe signals STB1 to STB4 in the state ST1. The state ST2 shows strobe signals STB1_max to STB4_max in the case in which the strobe length of each of the strobe signals STB1 to STB4 is the maximum due to the density correction. In an embodiment, the strobe length of each of the strobe signals STB1_max to STB4_max is a value obtained by multiplying the strobe length of each of reference strobe signals STB1 to STB4 by a maximum value of the voltage-based correction ratio (FIG. 9)×the number-of-dots-based correction ratio (FIG. 9). This maximum value can vary depending on a layout of a print target image and a battery voltage at the time of performing the simulation of the density correction.

This simulation of the density correction is intended to preliminarily estimate the maximum value of the strobe length, which is obtained by the density correction performed during printing, in order to determine the print speed prior to printing.

In the case of performing the density correction during printing, the strobe length of an applied strobe signal is varied per line, between reference strobe signals STB1 to STB4 and strobe signals STB1_max to STB4_max each having the maximum strobe length, in accordance with the number of simultaneously printing dots in each line of a print target image and the thermal head temperature.

The state ST2 in FIG. 11 shows a case in which the strobe signals STB1_max to STB4_max each having the maximum strobe length due to the density correction are not contained in a scanning line time SLT1 that is determined by the speed set value.

In view of this, the speed-reduction correction process is performed to correct the print speed so that the strobe signals STB1_max to STB4_max will be contained in the scanning line time. As described above, the print speed is adjusted by an increment of speed (e.g., 1 mm/second) less than that of the plurality of speed set values defined in the reference strobe table (1 IPS in the example in FIG. 6). This enables the strobe signals STB1_max to STB4_max to be contained while reduction in speed is suppressed as much as possible with respect to the speed set value set in advance.

The state ST3 in FIG. 11 shows a state in which the speed-reduction correction process is executed on the strobe signals STB1 to STB4 in the state ST1 to extend the scanning line time from SLT1 to SLT2. Extending the scanning line time in this manner prevents the strobe signals from being not contained in a scanning line time due to the density correction, in printing any line in a print target image (that is, even in printing a line having the maximum number of simultaneously printing dots in an image).

As described above, optical density is determined mainly by the density ratio (the finding (I)). In comparison with the state ST1, a density ratio of the reference strobe signals STB1 to STB4 is varied (decreased) in the state ST3 by extending the scanning line time from SLT1 to SLT2. Specifically, the density ratio is decreased from CP/SLT1 to CP/SLT2 in FIG. 11.

In order to cope with this, the density ratio correction process is executed on the strobe signals STB1 to STB4 in the state ST3 so that the density ratios will be the same before and after the speed-reduction correction process. The state ST4 in FIG. 11 shows strobe signals STB1_*c* to STB4_*c* after the density ratio correction process is performed.

Herein, assuming that a continuous pulse time after the density ratio correction process is performed is represented by CP_c, the strobe signals STB_c to STB4_*c* are determined so that the following formula (1) is satisfied. Thus, the continuous pulse time is increased by Δt, as shown in FIG. 11.

$$CP\_c=(SLT2/SLT1)\cdot CP \quad (1)$$

Although not shown in FIG. 11, in an embodiment, the speed-reduction correction process may be executed at least once on the strobe signals STB1_*c* to STB4_*c* in the state ST4 in FIG. 11. That is, as described above, optical density tends to be higher as the print speed is lower although the density ratio is not varied (the finding (II)). In the state ST4, although the density ratio is the same as that in the state ST1, the print speed is decreased, and accordingly, optical density is set to be higher than that in the state ST1. From this point of view, it is preferable to make the optical density close to that obtained by the strobe signals in the state ST1, by further executing the speed-reduction correction process on the strobe signals in the state ST4.

In an embodiment, each of the speed-reduction correction process and the density ratio correction process may be repeatedly executed a predetermined number of times.

As shown by the state ST4 in FIG. 11, the strobe length of each of the strobe signals STB1_*c* to STB4_*c* after the density ratio correction process is performed, is increased from the initial strobe length of each of the strobe signals STB1 to STB4 in the state ST1. Thus, the simulation of the density correction is executed on the strobe signals STB1_*c* to STB4_*c* to check whether strobe signals each having the maximum strobe length due to the density correction are contained in the scanning line time SLT2. In the case in which they are not contained in the scanning line time SLT2, a second speed-reduction correction process is executed. Execution of the second speed-reduction correction process causes the density ratio to be varied before and after the second speed-reduction correction process is executed. Thus, the density ratio is adjusted by executing a second density ratio correction process.

In this manner, in an embodiment, it is possible to determine the strobe signals to be desired values by repeating each of the speed-reduction correction process and the density ratio correction process a predetermined number of times. As described later, the number of times of executing each of the speed-reduction correction process and the density ratio correction process can be set as appropriate.

As described above, the density correction is performed on the strobe pattern, which is determined by the speed set value and the density set value in the reference strobe table, in accordance with a printing layout and operating environments in order to ensure print quality. However, performing only this density correction may not be sufficient, and thus, the print speed and the density ratio should be considered from the point of view of the findings (I) and (II). Thus, in the continuously variable speed method, the print speed is determined prior to printing by executing each of the speed-reduction correction process and the density ratio correction process at least once while adjusting the print speed, so that the density correction can function appropriately. This improves print quality of the whole print target image (achieves uniform optical density in the whole image).

In an embodiment, the control unit 11 of the printer 1 functions as a pulse setting unit, an application period correction unit, and a print speed determination unit as described below. They operate to vary the scanning line time from SLT1 to SLT2 in FIG. 11.

(a1) Pulse setting unit that sets a first strobe period (e.g., a period in which one or both of the strobe signals STB1 and STB2 are applied; an example of a first application period) for applying thermal energy that causes the thermal color developing layer of a label to develop color, to the plurality of heating elements of the thermal head 15, in a scanning line time for one line (a2) Application period correction unit that corrects the length of the first strobe period set by the pulse setting unit, based on an image to be printed (e.g., the number of simultaneously printing dots in one line in the image)

(a3) Print speed determination unit that determines print speed to be applied in printing the whole image at a constant speed, by extending the scanning line time so as to contain the maximum length of the first strobe period that has been corrected by the application period correction unit The control unit 11 of the printer 1, which functions as each of the units (a1) to (a3), prevents the first strobe period from not being contained in a scanning line time although the density correction is performed. Thus, the density correction is effectively performed during printing.

In addition, the print speed is made constant in the whole image. This prevents reduction in throughput due to acceleration and reduction of the print speed during printing and also avoids a decrease in print quality due to variations in the print speed during printing, compared with the existing stepwisely varying speed method.

Moreover, compared with the existing stepwise constant-speed method that performs printing at a constant speed set value, although throughput is reduced by extending the scanning line time (reducing the print speed), the print speed can be finely adjusted by a small increment of speed (e.g., 1 mm/second), whereby a degree of reduction in throughput is made as small as possible.

In an embodiment, the printer 1 executes the heat history control. In this case, the pulse setting unit sets, in addition to the first strobe period, a second strobe period (e.g., a period in which one or both of the strobe signals STB3 and STB4 are applied; an example of a second application period) for applying thermal energy insufficient to cause the thermal color developing layer of a label to develop color, to the plurality of heating elements of the thermal head 15.

The application period correction unit corrects the lengths of the first strobe period and the second strobe period. The print speed determination unit determines print speed to be applied in printing the whole image at a constant speed, by extending the scanning line time so as to contain the maximum lengths of the corrected first strobe period and the corrected second strobe period.

In an embodiment, the control unit 11 of the printer 1 also functions as a second application period correction unit that further corrects the length of the first strobe period corrected by the application period correction unit, so that a difference in the density ratios before and after the scanning line time is extended will be a predetermined value or less. This corresponds to the density ratio correction process that changes the state from the state ST3 to the state ST4 in FIG. 11. Executing the density ratio correction process allows the density ratio to be in a predetermined range, whereby optical density is made uniform, and print quality of the whole image is further improved.

Although the density ratio correction is performed so that the density ratios in the states ST1 and ST4 will be the same, as shown by the formula (1), in FIG. 11, the method of the density ratio correction is not limited thereto. Any method can be employed, as long as the difference in the density ratios before and after the density ratio correction process will be a predetermined value or less that does not substantially affect optical density.

Next, a series of processes for implementing the continuously variable speed method will be described with reference to FIGS. 12 to 16.

FIGS. 12 to 15 are flowcharts corresponding to process-before-printing that is performed before printing. FIG. 16 is a flowchart corresponding to process-while-printing that is performed while printing. Each flowchart is executed by the control unit 11 (the CPU 111 and the head controller 112).

The following describes process-before-printing of an embodiment.

Figure 12:
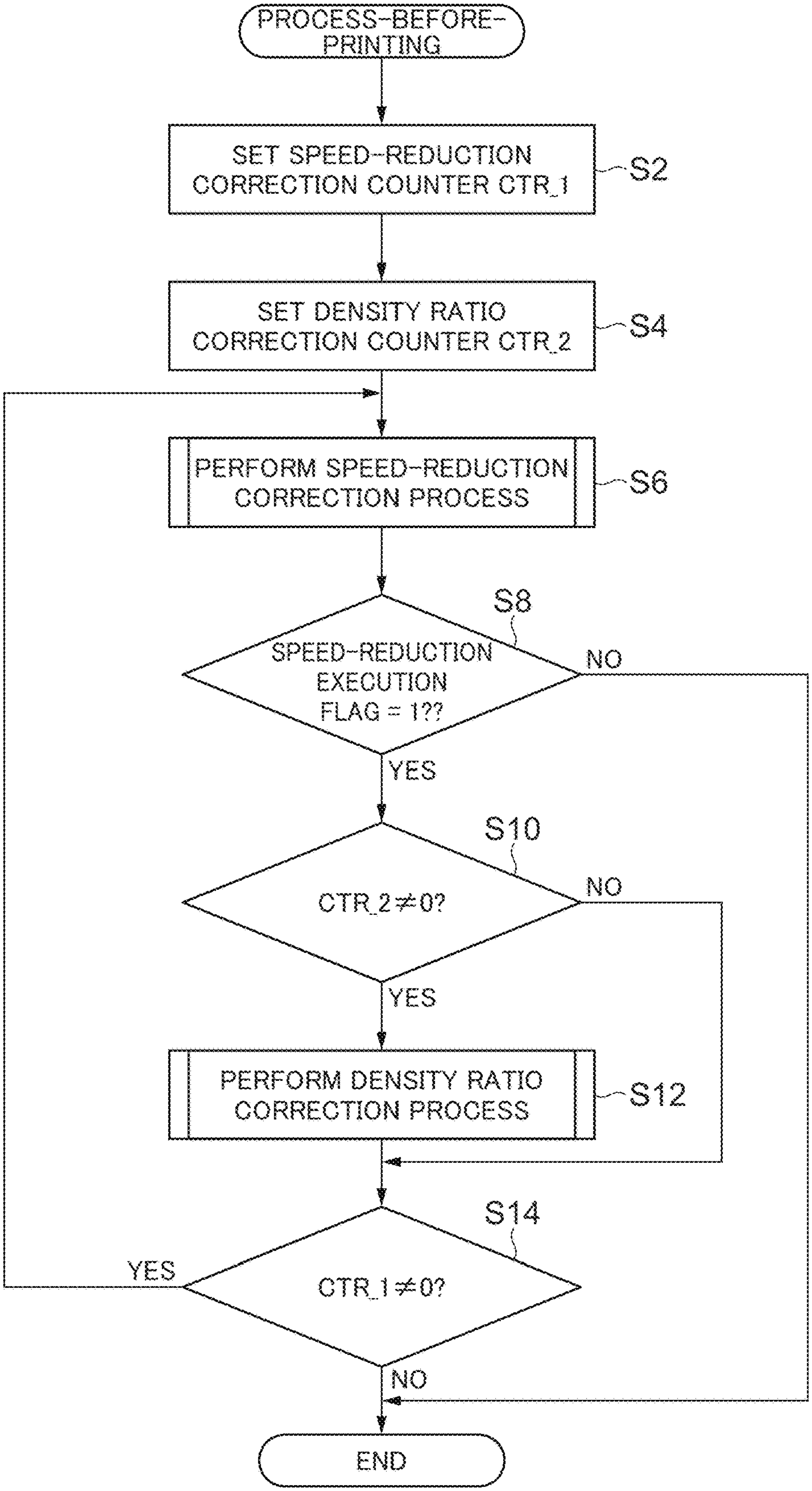
FIG. 12 is a flowchart of process-before-printing in a printer of an embodiment.

FIG. 12 shows a general flow of the process-before-printing of an embodiment. This general flow shows a flow of repeating each of the speed-reduction correction process and the density ratio correction process a predetermined number of times as described above.

First, the control unit 11 sets a speed-reduction correction counter CTR_1 (step S2) and a density ratio correction counter CTR_2 (step S4). The speed-reduction correction counter CTR_1 specifies an upper limit of the number of times of performing the speed-reduction correction process. The density ratio correction counter CTR_2 specifies an upper limit of the number of times of performing the density ratio correction process.

In one example, a value (set value) that is set to the speed-reduction correction counter CTR_1 is 2, whereas a value (set value) that is set to the density ratio correction counter CTR_2 is 1. Although the set value of each counter is not limited, they are set so as to satisfy a relationship "CTR_1>CTR_2."

Steps S6 to S14 in FIG. 12 are configured to execute each of the speed-reduction correction process (step S6) and the density ratio correction process (step S12) a number of times shown by the set value set in step S2 or S4. A speed-reduction execution flag is a flag indicating whether reduction of the print speed (that is, extension of the scanning line time) is executed in the speed-reduction correction process. The flag shows "1" when reduction of the print speed is executed.

As described later, in the speed-reduction correction process, when the print speed is reduced because the strobe signals are not contained in the scanning line time, the speed-reduction execution flag is changed to "1," and the value of the speed-reduction correction counter CTR_1 is subtracted by one. In the speed-reduction correction process, when the strobe signals are contained in the scanning line time, the speed-reduction execution flag remains "0." In addition, the value of the density ratio correction counter CTR_2 is subtracted by one, each time the density ratio correction process is executed.

Under these conditions, in the flow in FIG. 12, when the speed-reduction execution flag is "0" (that is, the strobe signals are contained in the scanning line time) as a result of executing the speed-reduction correction process (step S6) (step S8: NO), the control unit 11 ends the process-before-printing. When the speed-reduction execution flag is "1" (step S8: YES), execution of the density ratio correction process (step S12) is determined based on whether the density ratio correction counter CTR_2 is "0" (step S10).

After the density ratio correction process is executed, it is determined whether the speed-reduction correction counter CTR_1 is "0" (step S14). The control unit 11 ends the process-before-printing when the speed-reduction correction counter CTR_1 is "0"; otherwise, when it is not "0," the control unit 11 returns to step S6 to execute the speed-reduction correction process.

In this manner, each of the speed-reduction correction process and the density ratio correction process is executed a number of times shown by the set value of each counter.

Next, details of the speed-reduction correction process will be described with reference to FIG. 13.

Figure 13:
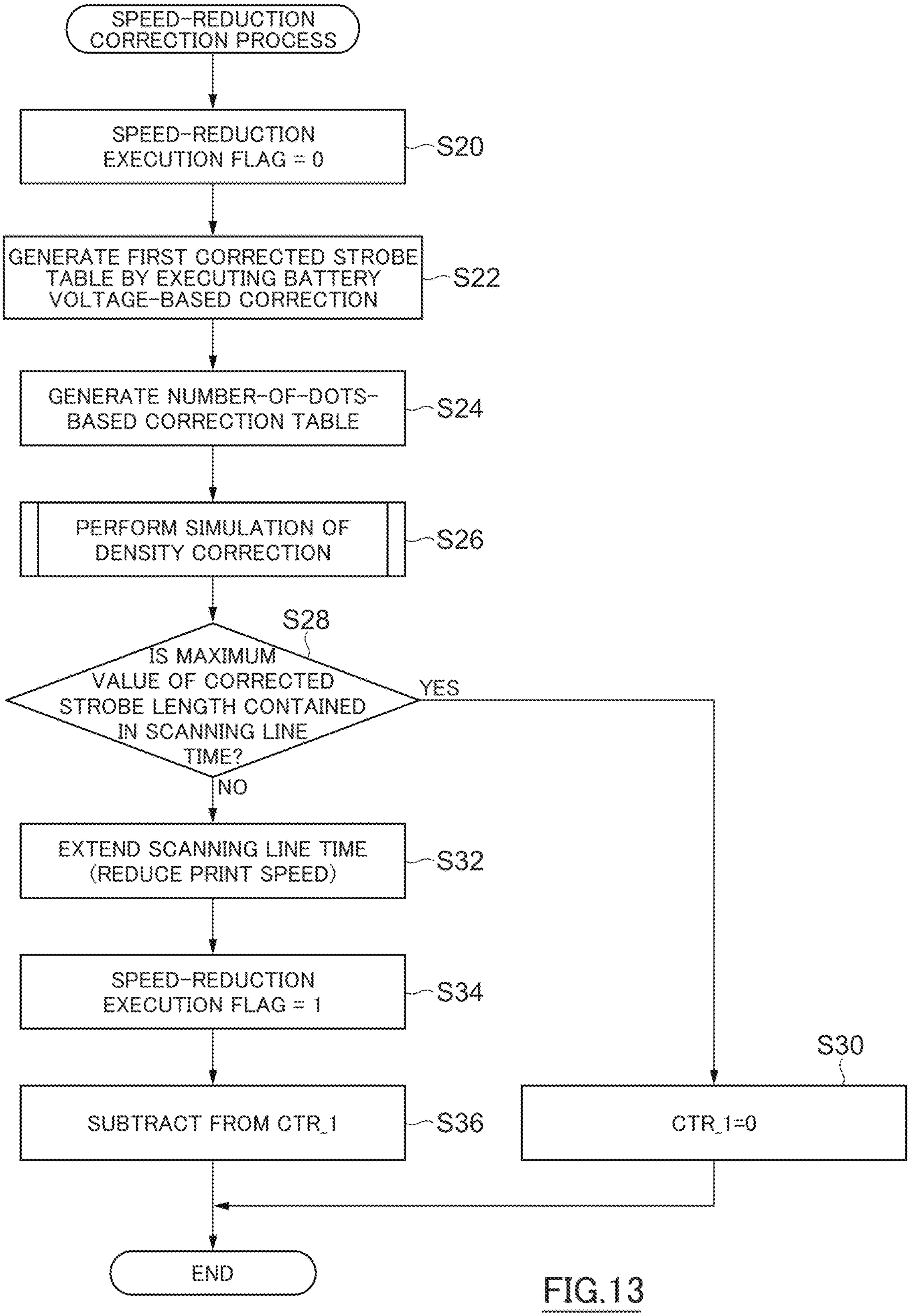
FIG. 13 is a flowchart of a speed-reduction correction process included in the process-before-printing in FIG. 12.

With reference to FIG. 13, in the speed-reduction correction process, the control unit 11 first initializes the speed-reduction execution flag to "0" (step S20).

Then, the control unit 11 generates a first corrected strobe table based on the reference strobe table (step S22). More specifically, the control unit 11 refers to the battery voltage-based correction table (FIG. 9) to determine the voltage-based correction ratio corresponding to a current battery voltage. The control unit 11 then multiplies each strobe length in the reference strobe table by the determined voltage-based correction ratio, to generate the first corrected strobe table.

In step S22, instead of generating a first corrected strobe table corresponding to all strobe patterns in the reference strobe table, a corrected strobe length corresponding to a strobe pattern at a current speed set value and a current density set value in the reference strobe table, may be calculated.

Thereafter, the control unit 11 generates a number-of-dots-based correction table (step S24). In an embodiment, a number-of-dots-based correction table (FIG. 9) is individually prepared for each of the head voltage drop-based correction and the source voltage drop-based correction. In this case, the control unit 11 performs multiplication using the number-of-dots-based correction ratio corresponding to battery voltage in each of the number-of-dots-based correction table for the head voltage drop-based correction and the number-of-dots-based correction table for the source voltage drop-based correction. Thus, the control unit 11 generates a number-of-dots-based correction table based on the combination of the head voltage drop-based correction and the source voltage drop-based correction.

Figure 14:
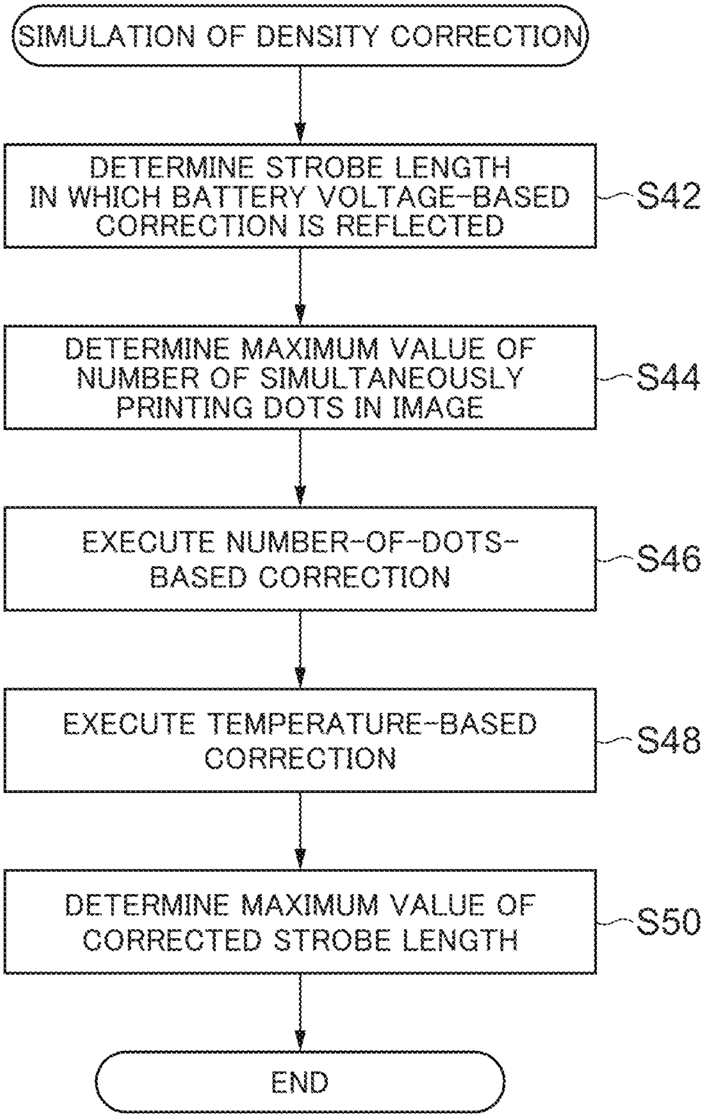
FIG. 14 is a flowchart of a simulation of density correction, which is included in the speed-reduction correction process in FIG. 13.

Then, the control unit 11 executes the simulation of the density correction, details of which is shown in FIG. 14 (step S26).

As described above, the simulation of the density correction is intended to preliminarily estimate the maximum value of the strobe length due to the density correction performed during printing, in order to determine the print speed prior to printing. In other words, the simulation of the density correction is a process for estimating the maximum value of a corrected strobe length, prior to printing, in order to ensure that the corrected strobe length is contained in the scanning line time even when the strobe length (corrected strobe length) becomes the maximum due to the density correction performed during printing.

With reference to FIG. 14, the simulation of the density correction is performed as follows.

First, the control unit 11 refers to the first corrected strobe table, which is generated in step S22, to determine the strobe length of each strobe signal corresponding to a current speed set value and a current density set value (step S42). Herein, the determined strobe length is a strobe length in which the battery voltage-based correction is performed on a corresponding value in the reference strobe table.

Then, the control unit 11 analyzes a print target image to determine the maximum value among the numbers of simultaneously printing dots in respective lines in the image (step S44), and it executes number-of-dots-based correction (step S46). That is, the control unit 11 determines the number-of-dots-based correction ratio corresponding to the maximum value of the number of simultaneously printing dots, which is determined in step S44, by referring to the number-of-dots-based correction table generated in step S42.

Thereafter, the control unit 11 executes temperature-based correction (step S48). More specifically, the control unit 11 refers to the temperature-based correction table (FIG. 10) to determine the temperature-based correction ratio corresponding to a current thermal head temperature.

With reference to the temperature-based correction table, correction is performed during printing such that, as the thermal head temperature decreases from the current value, the temperature-based correction ratio increases to extend the strobe length; however, it is not necessary to consider such correction in the simulation of the density correction. This is because the thermal head temperature during printing tends to become higher than that at the time of executing the simulation of the density correction.

Finally, the control unit 11 determines the maximum value of the corrected strobe length (step S50). In step S50, the control unit 11 determines the maximum value of the corrected strobe length by multiplying the strobe length of each of the strobe signals STB1 to STB4 determined in step S44, by the number-of-dots-based correction ratio determined in step S46 and the temperature-based correction ratio determined in step S48.

Reference is now made back to FIG. 13.

After executing the simulation of the density correction, the control unit 11 determines whether the maximum value of the corrected strobe length is contained in the scanning line time (step S28). In the case in which the maximum value of the corrected strobe length is contained in the scanning line time, it is not necessary to vary the print speed, and thus, the speed-reduction correction counter CTR_1 is set to "0" (step S30). In this case, the speed-reduction execution flag remains "0," and therefore, the control unit 11 ends the process-before-printing (step S8 in FIG. 12: NO).

In the case in which the maximum value of the corrected strobe length is not contained in the scanning line time (step S28: NO), the control unit 11 extends the scanning line time so as to contain the maximum value of the corrected strobe length (that is, the print speed is reduced) (step S32). At this time, the print speed is preferably adjusted by an increment of speed (e.g., 1 mm/second) less than that of the plurality of speed set values defined in the reference strobe table (1 IPS in the example in FIG. 6).

The control unit 11 changes the speed-reduction execution flag to "1" in response to decrease of the print speed (step S34) and subtracts one from the speed-reduction correction counter CTR_1 (step S36).

Next, details of the density ratio correction process will be described with reference to FIG. 15.

Figure 15:
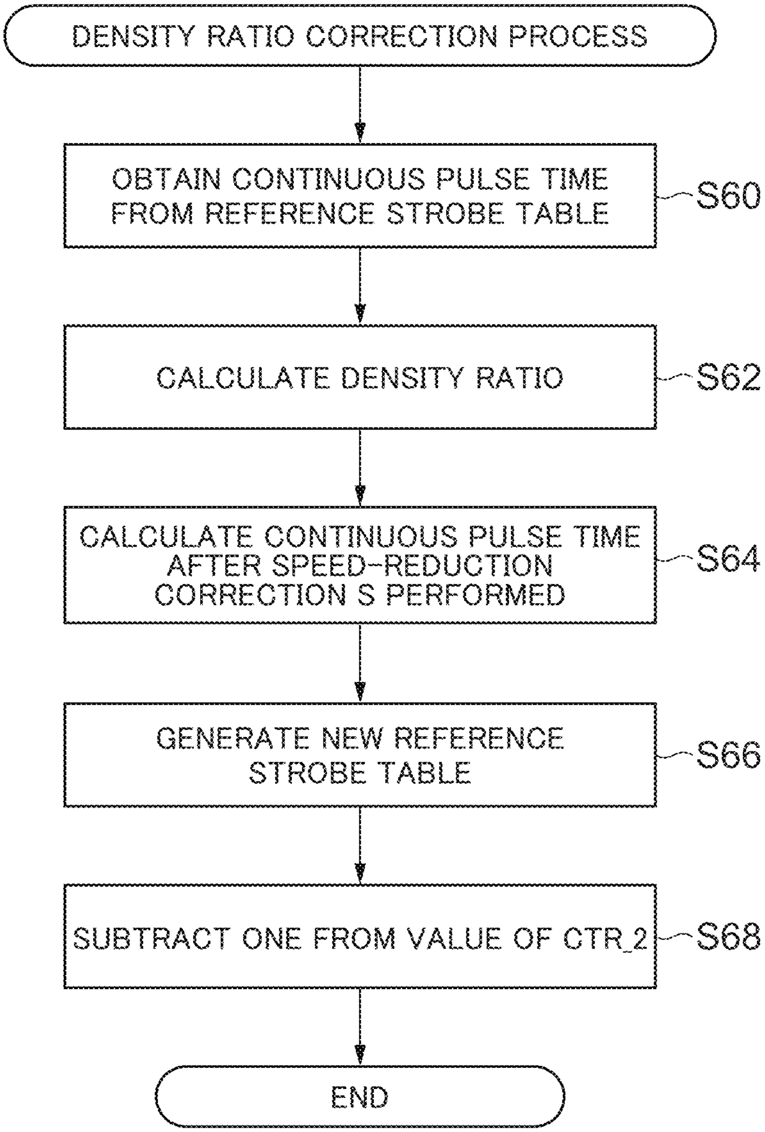
FIG. 15 is a flowchart of a density ratio correction process included in the process-before-printing in FIG. 12.
Figure 16:
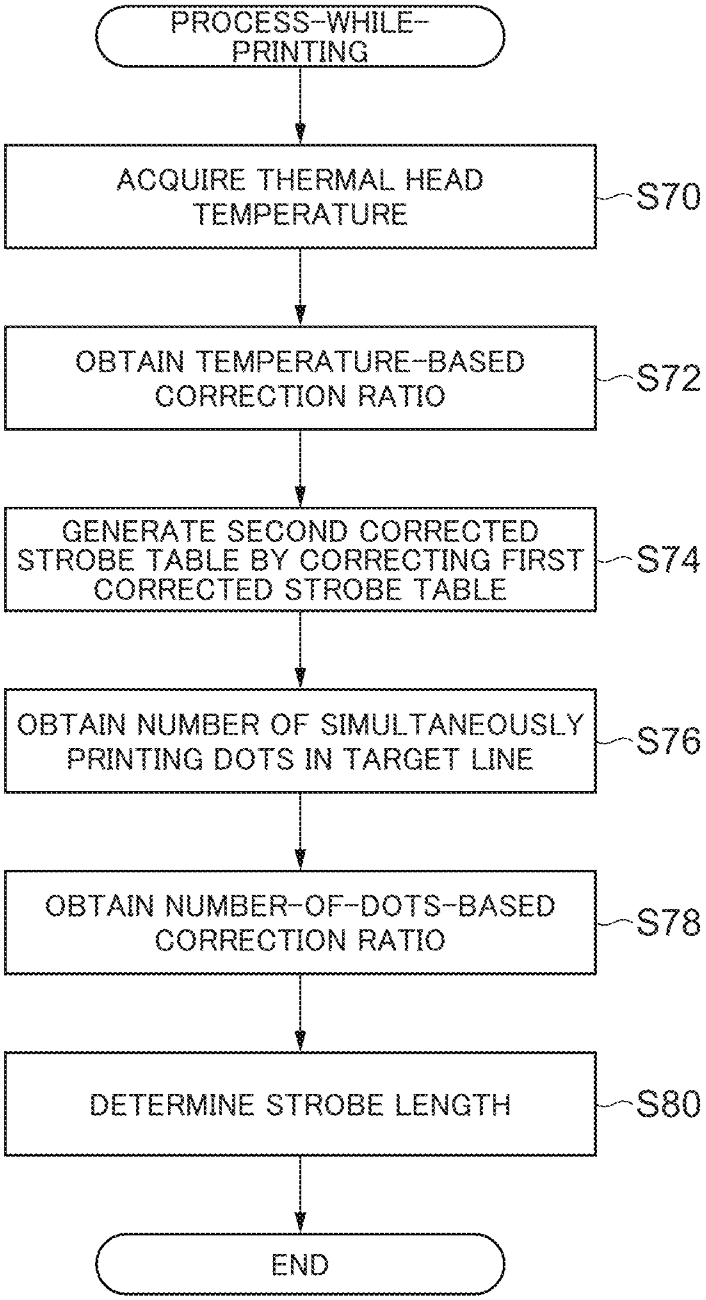
FIG. 16 is a flowchart of process-while-printing in a printer of an embodiment.

With reference to FIG. 15, in the density ratio correction process, the control unit 11 first obtains a continuous pulse time CP (refer to the state ST1 in FIG. 11) corresponding to a current speed set value and a current density set value, from the reference strobe table (e.g., FIG. 6) (step S60). The control unit 11 then calculates the density ratio (step S62). The density ratio is a value obtained by dividing the continuous pulse time CP by a scanning line time corresponding to the speed set value.

Then, the control unit 11 calculates a continuous pulse time after the speed-reduction correction is performed (that is, immediately after step S32 in the speed-reduction correction process is executed) (step S64), and it generates a new reference strobe table (step S66). Herein, the continuous pulse time is corrected so that the density ratios will be the same before and after the speed-reduction correction, as shown by the formula (1). Anew reference strobe table is generated based on the corrected continuous pulse time. This new reference strobe table is used as a reference in generating a first corrected strobe table when the speed-reduction correction process is executed later.

Finally, the control unit 11 subtracts one from the density ratio correction counter CTR_2 (step S68).

In step S66, instead of generating a new reference strobe table corresponding to all strobe patterns, a new strobe length corresponding to a strobe pattern at a current speed set value and a current density set value may be calculated.

The above-described steps are performed in the process-before-printing of an embodiment. Each of the speed-reduction correction process and the density ratio correction process is repeated a predetermined number of times, whereby the print speed, the scanning line time, and the first corrected strobe table that is used in the process-while-printing, are determined prior to printing.

Next, the process-while-printing will be described with reference to FIG. 16.

Printing is performed on the whole print target image at a constant print speed that is determined in the process-before-printing. In the process-while-printing, a series of steps shown in FIG. 16 is performed per line. The following description refers to a line that is to be subjected to the process-while-printing, as a "target line."

With reference to FIG. 16, first, the control unit 11 acquires a thermal head temperature from the thermistor 4 (step S70) and refers to the temperature-based correction table (FIG. 10) to obtain (determine) the temperature-based correction ratio corresponding to the acquired thermal head temperature (step S72). As described above, the temperature-based correction ratio may be calculated based on a reference value and a current value of the thermal head temperature.

Then, the control unit 11 corrects the first corrected strobe table, which is generated in the speed-reduction correction process prior to printing (step S22 in FIG. 13), by using the temperature-based correction ratio obtained in step S72, to generate a second corrected strobe table (step S74). The first corrected strobe table, in which the battery voltage-based correction is reflected, is also used in the process-while-printing because the battery voltage during printing is approximately the same as that prior to printing. Each strobe length that is described in the second corrected strobe table is a value obtained by multiplying the corresponding strobe length in the first corrected strobe table by the temperature-based correction ratio.

Thereafter, the control unit 11 obtains a number of simultaneously printing dots of a target line (step S76) and refers to the number-of-dots-based correction table (FIG. 9) to obtain a number-of-dots-based correction ratio corresponding to the obtained number of simultaneously printing dots (step S78). The control unit 11 then determines the strobe length of each strobe signal to be used in the target line by multiplying the strobe length of each strobe signal corresponding to a current speed set value and a current density set value in the second corrected strobe table, by the number-of-dots-based correction ratio acquired in step S78 (step S80).

In the speed-reduction correction process prior to printing (step S22 in FIG. 13), a corrected strobe length corresponding to a strobe pattern at the current speed set value and the current density set value may be calculated instead of generating the first corrected strobe table. In this case, in step S74, a strobe length is calculated by further correcting this corrected strobe length with the use of the temperature-based correction ratio obtained in step S72. This process is equivalent to that of step S80.

The above-described steps are performed in the process-while-printing of an embodiment. For each target line, the strobe length of each strobe signal in a scanning line time is determined by executing the density correction based on the thermal head temperature and the number of simultaneously printing dots.

The print speed is already adjusted based on the corrected strobe signal having the maximum value due to the density correction, in the process-before-printing. Thus, the strobe length of each strobe signal, which is determined in step S80, is contained in a scanning line time for every line in the print target image.

Although an example of setting four strobe application periods during a scanning line time in the heat history control, has been described in relation to an embodiment, the number of the periods is not limited thereto and may be three, five, or greater. Increasing the number of strobe application periods allows greater number of strobe levels, resulting in more precise control.

As described above, the flowchart in each of FIGS. 12 to 16 is executed by the control unit 11 (the CPU 111 and the head controller 112). In this case, in an embodiment, the control unit 11 of the printer 1 functions as a pulse setting unit, a first correction unit, and a second correction unit as described below.

(b1) Pulse setting unit that sets a first strobe period (e.g., a period in which one or both of the strobe signals STB1 and STB2 are applied; an example of a first application period) for applying thermal energy that causes the thermal color developing layer of a label to develop color, to the plurality of heating elements of the thermal head 15, in a scanning line time for one line (b2) First correction unit that corrects the print speed for printing, in such a manner as to reduce it from the speed set value, before printing is performed on a label (b3) Second correction unit that corrects one or both of the length of the first strobe period and the print speed corrected by the first correction unit, so that a difference in the density ratios before and after the first correction unit corrects the print speed will be a predetermined value or less Herein, the first correction unit performs a first speed-reduction correction process. The second correction unit performs one or both of the density ratio correction process that is performed after the first speed-reduction correction process, and a second or subsequent speed-reduction correction process.

The second correction unit may perform at least one or both of the process of correcting the print speed and the process of correcting the length of the first strobe period. That is, the density ratio, which can vary depending on one or both of the print speed and the first strobe period, can be adjusted to a desired range by individually performing correction of the print speed and correction of the length of the first strobe period, or by performing both of these corrections. In this case, the method for adjusting the density ratio to a desired range is not limited to the method based on the process-before-printing in FIG. 12.

These processes enable preventing print quality from being degraded (that is, enables reducing variations in optical density during printing) when the print speed is varied from the speed set value before printing is performed on a label. In other words, it is possible to prevent print quality from being degraded when printing is performed at a print speed different from any one of the plurality of speed set values specified in the reference strobe table. As a result, as long as speed setting and density setting are not changed in the printer 1, a user can obtain approximately the same degree of print quality at any time, irrespective of operating environments of the printer 1 and a layout of a print target image.

The strobe length of each strobe pattern, which is described in the reference strobe table, is determined in advance by trial and error for obtaining a certain optical density (that is, it is already verified). Thus, when the print speed is varied from the speed set value specified in the reference strobe table, the print speed after the variation is not verified as to print quality. Even with the print speed after the variation, it is possible to make the level of the optical density approximately the same as that already verified, by executing the speed-reduction correction process and the density ratio correction process.

In an embodiment, the second correction unit includes a ratio correction unit and a print speed correction unit as described below.

(c1) Ratio correction unit that executes the process for correcting the length of the first strobe period so that the density ratio will not be substantially changed before and after the first correction unit corrects the print speed (density ratio correction process)

(c2) Print speed correction unit that executes the process for correcting the print speed so as to further reduce the print speed corrected by the first correction unit (speed-reduction correction process)

That is, as shown in FIG. 12, in controlling both of the print speed and the density ratio, the strobe length is efficiently determined by successively performing the density ratio correction process and the speed-reduction correction process. The number of times of executing each process can be specified by the set value of the counter corresponding to each process, as described with reference to FIG. 12.

In an embodiment, when the printer 1 executes the heat history control, the pulse setting unit sets, in addition to the first strobe period, a second strobe period (e.g., a period in which one or both of the strobe signals STB3 and STB4 are applied; an example of a second application period) for applying thermal energy insufficient to cause the thermal color developing layer of a label to develop color, to the plurality of heating elements of the thermal head 15.

The first correction unit corrects the print speed so that the first strobe period and the second strobe period will be contained in a scanning line time. The second correction unit corrects one or both of the lengths of the first strobe period and the second strobe period, and the print speed corrected by the first correction unit, so that a difference in the density ratios before and after the first correction unit corrects the print speed will be a predetermined value or less.

In an embodiment, printing is executed without performing the heat history control. In this case, the continuously variable speed method can be also employed.

Figure 17:
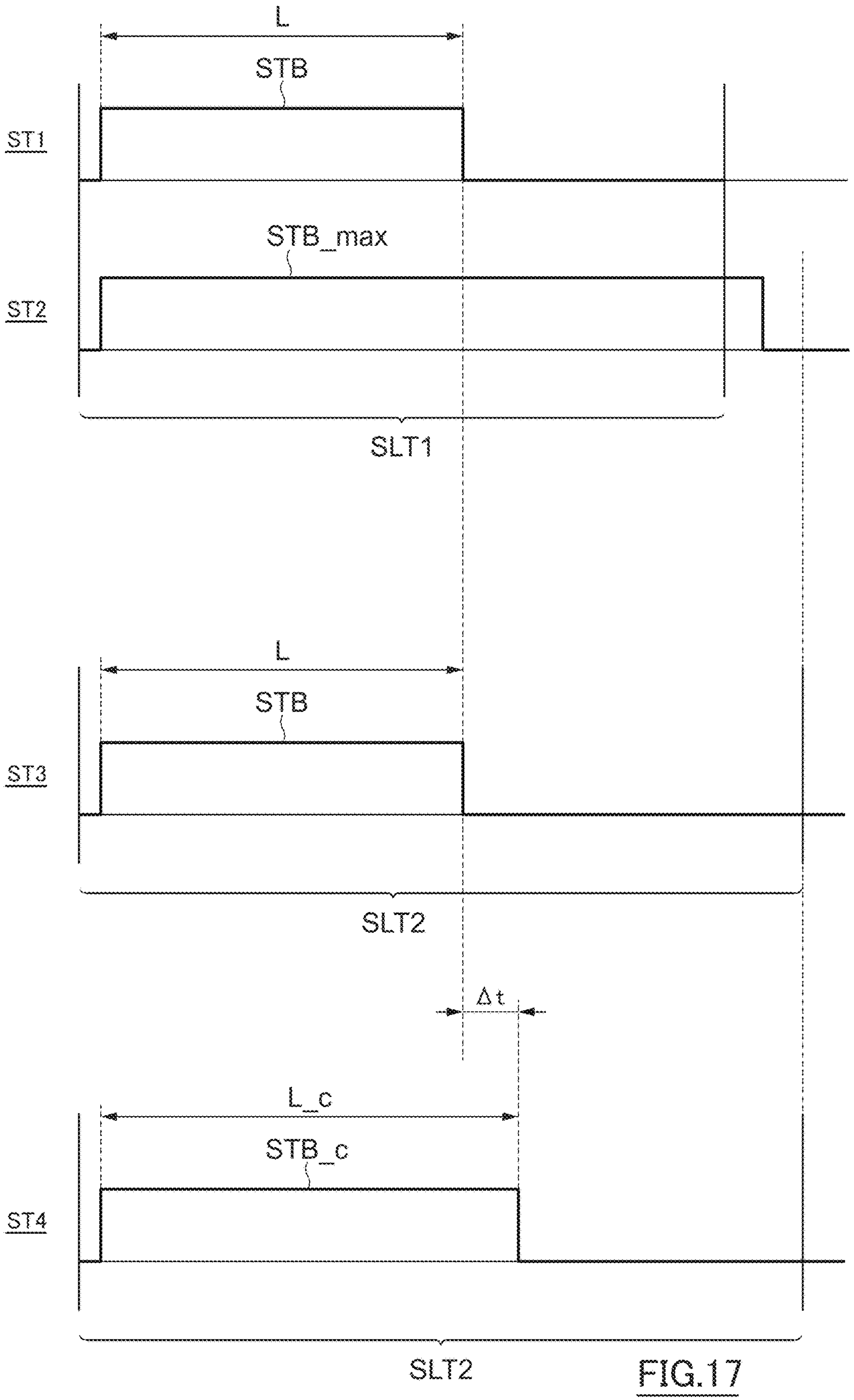
FIG. 17 illustrates the continuously variable speed method in a printer of an embodiment.

FIG. 17 corresponds to FIG. 11 and shows the continuously variable speed method in a case in which the heat history control is not performed. When the heat history control is not performed, a single strobe signal STB is set during a scanning line time for one line. In this case, the length of the strobe period for applying thermal energy that causes the thermal color developing layer to develop color, is equal to a strobe length "L" of the strobe signal STB.

The state ST2 in FIG. 17 shows a result of performing the simulation of the density correction on the strobe signal STB in the state ST1. The state ST2 shows a strobe signal STB_max in the case in which the strobe length "L" of the strobe signal STB is the maximum due to the density correction. In an embodiment, the strobe length of the strobe signal STB_max is a value obtained by multiplying a reference strobe length "L" by a maximum value of the voltage-based correction ratio (FIG. 9)×the number-of-dots-based correction ratio (FIG. 9).

The state ST2 in FIG. 17 shows a case in which the strobe signal STB_max having the maximum strobe length due to the density correction is not contained in a scanning line time SLT1 that is determined by the speed set value.

The state ST3 in FIG. 17 shows a state in which the speed-reduction correction process is executed on the strobe signal STB in the state ST1 to extend the scanning line time from SLT1 to SLT2. Extending the scanning line time in this manner prevents the strobe signal from being not contained in a scanning line time due to the density correction, even in printing a line having the maximum number of simultaneously printing dots in an image.

The density ratio correction process is executed on the strobe signal STB in the state ST3, whereby a strobe signal STB_c in the state ST4 is obtained.

Herein, assuming that the strobe length "L" after the density ratio correction process is performed is represented by L_c, the strobe signal STB_c is determined so that the following formula (2) is satisfied. Thus, the continuous pulse time is increased by Δt, as shown in FIG. 17.

$$L\_c=(SLT2/SLT1)\cdot L \quad (2)$$

In an embodiment, a printing method for a printer including the following steps is disclosed.

(d1) Step of setting a first strobe period of a strobe signal for applying thermal energy that causes the thermal color developing layer of a label to develop color, to the plurality of heating elements of the thermal head 15, during a scanning line time for one line (d2) Step of correcting the length of the set first strobe period, based on an image to be printed (d3) Step of determining print speed to be applied in printing the whole image at a constant speed, by extending the scanning line time so as to contain the maximum length of the corrected first strobe period In an embodiment, a printing method for a printer including the following steps is disclosed.

(e1) Step of setting a first strobe period of a strobe signal for applying thermal energy that causes the thermal color developing layer of a label to develop color, to the plurality of heating elements, during a scanning line time for one line (e2) Step of correcting the print speed for printing, in such a manner as to reduce the print speed from the speed set value, before printing is performed on a label (e3) Step of correcting one or both of the length of the first strobe period and the corrected print speed, so that a difference in the density ratios before and after the print speed is corrected will be a predetermined value or less A program according to an embodiment is a program configured to cause a computer to execute the printing method for the printer. For example, in response to the CPU 111, which is included in the control unit 11 of the printer 1, executing the program, the printing method for the printer is executed.

In an embodiment, this program may be recorded in a non-transitory computer-readable recording medium.

Although details of some embodiments of the printer, the printing method for the printer, and the program of the present invention are described above, the scope of the present invention should not be limited to the foregoing embodiments. In addition, the embodiments described above can be variously modified and altered within the scope not departing from the gist of the present invention.

The present invention is related to Japanese Patent Application No. 2021-95021 filed with the Japan Patent Office on Jun. 7, 2021, the entire contents of which are incorporated into this specification by reference.

The invention claimed is:

1. A printer being configured to print on a print medium having a thermal color developing layer, the printer comprising:

a thermal head having a plurality of heating elements that are arranged in a line; and a processor configured to:

set a first application period of a pulse of energizing current for applying to the plurality of heating elements during a scanning line time for one line to cause the thermal color developing layer to develop color, correct a length of the first application period based on an image to be printed, determine a print speed to be applied in printing the whole image at a constant speed by extending the scanning line time so as to contain a maximum length of first application periods that have been corrected by the processor, and further correct the length of the first application period so that a first ratio of the first application period of the pulse of energizing current during the scanning line time before the processor determines the print speed and a second ratio of the first application period of the pulse of energizing current during the scanning line time after the processor determines the print speed will be the same.

2. The printer according to claim 1, further comprising:

a storage configured to store data of the length of the first application period of the pulse of energizing current in the scanning line time for one line with respect to each of a plurality of print speeds that are set so as to increase by a predetermined first increment of speed, wherein the processor is configured to determine the print speed by adjusting one of the by plurality of print speeds by a second increment of speed that is less than the predetermined first increment of speed.

3. The printer according to claim 2, further comprising:

a battery configured to supply power to the thermal head, wherein the processor is configured to correct the length of the first application period based on voltage of the battery.

4. The printer according to claim 2, further comprising:

a temperature measuring unit configured to measure temperature of the thermal head, wherein the processor is configured to correct the length of the first application period based on the temperature of the thermal head.

5. The printer according to claim 2, wherein:

the processor is further configured to:

set a second application period of a pulse of energizing current for applying to the plurality of heating elements during the scanning line time for the one line, the pulse of energizing current insufficient to cause the thermal color developing layer to develop color, correct lengths of the first application period and the second application period based on the image, and determine the print speed to be applied in printing the whole image at a constant speed, by extending the scanning line time so as to contain maximum lengths of the first application periods and the second application periods that have been corrected by the processor.

6. The printer according to claim 1, further comprising:

a battery configured to supply power to the thermal head, wherein the processor is configured to correct the length of the first application period based on voltage of the battery.

7. The printer according to claim 1, further comprising:

a temperature measuring unit configured to measure temperature of the thermal head, wherein the processor is configured to correct the length of the first application period based on the temperature of the thermal head.

8. The printer according to claim 1, wherein:

the processor is further configured to:

set a second application period of a pulse of energizing current for applying to the plurality of heating elements during the scanning line time for the one line, the pulse of energizing current being insufficient to cause the thermal color developing layer to develop color, correct lengths of the first application period and the second application period based on the image; and determine the print speed to be applied in printing the whole image at a constant speed, by extending the scanning line time so as to contain maximum lengths of the first application periods and the second application periods that have been corrected by the processor.

9. A printing method for a printer that comprises a thermal head that has a plurality of heating elements arranged in a line, the printer being configured to print on a print medium having a thermal color developing layer, the printing method comprising:

setting a first application period of a pulse of energizing current for applying to the plurality of heating elements during a scanning line time for one line to cause the thermal color developing layer to develop color;

correcting a length of the set first application period based on an image to be printed;

determining a print speed to be used in printing the whole image at a constant speed by extending the scanning line time so as to contain a maximum length of first application periods that have been corrected; and further correcting the length of the first application period so that a first ratio of the first application period of the pulse of energizing current during the scanning line time before the print speed is determined and a second ratio of the first application period of the pulse of energizing current during the scanning line time after the print speed is determined will be the same.

10. A non-transitory recording medium containing a program, the program being configured, when installed in a printer to cause a computer to execute a predetermined method, the printer comprising a thermal head that has a plurality of heating elements arranged in a line, the printer being configured to print on a print medium having a thermal color developing layer, the predetermined method comprising:

setting a first application period of a pulse of energizing current for applying to the plurality of heating elements during a scanning line time for one line to cause the thermal color developing layer to develop color, correcting a length of the set first application period based on an image to be printed;

determining a print speed to be used in printing the whole image at a constant speed by extending the scanning line time so as to contain a maximum length of first application periods that have been corrected; and further correcting the length of the first application period so that a first ratio of the first application period of the pulse of energizing current during the scanning line time before the print speed is determined and a second ratio of the first application period of the pulse of energizing current during the scanning line time after the print speed is determined will be the same.

* * * * *